(12) United States Patent
Goldberg et al.

(10) Patent No.: US 7,536,329 B2
(45) Date of Patent: May 19, 2009

(54) METHOD AND APPARATUS FOR AN INCOMPLETE INFORMATION MODEL OF CREDIT RISK

(75) Inventors: Lisa Robin Goldberg, Kensington, CA (US); Kay Giesecke, Ithaca, NY (US)

(73) Assignee: Barra, Inc., Berkeley, CA (US)

( * ) Notice: Subject to any disclaimer, the term of this patent is extended or adjusted under 35 U.S.C. 154(b) by 1040 days.

(21) Appl. No.: 10/761,686

(22) Filed: Jan. 20, 2004

(65) Prior Publication Data

US 2004/0225598 A1    Nov. 11, 2004

Related U.S. Application Data

(60) Provisional application No. 60/505,532, filed on Sep. 23, 2003, provisional application No. 60/440,943, filed on Jan. 17, 2003.

(51) Int. Cl.
    *G06Q 40/00*    (2006.01)
(52) U.S. Cl. .................. 705/35; 708/131; 708/132; 708/134
(58) Field of Classification Search .............. 705/35, 705/36 R, 38; 708/131, 132, 134; 434/107, 434/188, 191
    See application file for complete search history.

(56) References Cited

U.S. PATENT DOCUMENTS 6,078,903 A * 6/2000 Kealhofer .................. 705/36 R

OTHER PUBLICATIONS

Duffie and Lando, "Term Structures of Credit Spreads with Incomplete Accounting Information," Econometrica, 69(3):633-664(2001).*
Kay Giesecke's article Default Compensator, Incomplete Information, and the Term Structure of Credit Spreads, Dec. 12, 2001.*
http://www.stanford.edu/dept/MSandE/people/faculty/giesecke/publications.html.*
Black and Cox, "Valuing Corporate Securities: Some Effects of Bond Indenture Provisions," *J. of Finance* 31(2):351-367. (1976).

(Continued)

*Primary Examiner*—Mary Cheung
*Assistant Examiner*—Brian Fertig
(74) *Attorney, Agent, or Firm*—Michael A. Glenn; Glenn Patent Group

(57) ABSTRACT

A method and apparatus for developing a structural model of credit risk that incorporates the short-term uncertainty inherent in default events is disclosed. The model is based on the assumption of incomplete information, taking as premise that bond investors are not certain about the true level of a firm's value that may trigger default. In addition, the coherent integration of structure and uncertainty is facilitated with compensators. Compensators form the infrastructure of a class of credit models that is broad enough to include traditional structural models, intensity-based models, and a great deal more. Several empirical examples are provided that compare default probabilities and credit yield spreads forecast by the incomplete information model to the output of a Black and Cox (1976) model. It is found that the incomplete information model reacts more quickly and, unlike traditional structural models, forecasts positive short-term credit spreads for firms that are in distress. It is also demonstrated that while the model is predicated on the surprise nature of default, it does not have conditional default rate.

33 Claims, 14 Drawing Sheets

OTHER PUBLICATIONS

CredidGrades Technical Document, Ed. C.C. Finger & RiskMetrics Group pp. 1-52 (2202).

Duffie and Lando, "Term Structures of Credit Spreads With Incomplete Accounting Information," *Econometrica*, 69(3):633-664 (2001).

Kay Giesecke, Default and Information, Cornell University, Jun. 2, 2001 this version Aug. 20, 2003 pp. 1-45.

Merton, Robert C., "On The Pricing of Corporate Debt: The Risk Structure of Interest Rates," *J. of Finance* 29:449-470 (1974).

* cited by examiner

METHOD AND APPARATUS FOR AN INCOMPLETE INFORMATION MODEL OF CREDIT RISK

CROSS-REFERENCE TO RELATED APPLICATIONS

This application claims priority to U.S. Provisional Patent Application Ser. No. 60/440,943, filed Jan. 17, 2003, and to U.S. Provisional Patent Application Ser. No. 60/505,532, filed Sep. 23, 2003, both of which applications are incorporated herein in their entirety by the reference thereto.

BACKGROUND OF THE INVENTION

1. Technical Field

The invention relates generally to forecasting systems modeling credit risk. More particularly, the invention relates to a computer implemented method and apparatus for modeling default risk in view of incomplete information.

2. Description of the Prior Art

To a corporate bond investor, there is no piece of information more valuable than the likelihood that an issuer will default. Correspondingly, in the wake of the burgeoning corporate bond and credit derivative markets, there is a fast-growing industry that builds models to estimate default probabilities and tools to manage portfolios that contain credit-sensitive instruments. There are currently two main quantitative approaches to credit risk management.

The structural approach takes the cause and effect nature of default as a starting point and thereby relies on a precise definition of a default event. It should be appreciated that it can be difficult to give a precise definition of default that is of practical use to modelers and designers of credit derivatives. Working definitions include missed principal or interest payments, firm value falling below a specified boundary, and firm restructuring. Structural models were introduced in R. Merton, *On the pricing of corporate debt: The risk structure of interest rates*, Journal of Finance 29, 449-470, (1974). Merton's fundamental insight was that firm debt can be viewed as a portfolio of government bonds and a short put option on the firm value. Black and Cox (1976) extended these seminal contributions by allowing for a broader definition of default. For example, the bondholders may have the right to force liquidation as soon the firm value falls to some prescribed lower threshold. Thus, in the structural framework the value of the debt and the probability of default can be backed out of an appropriately calibrated option formula.

The Merton and Black and Cox models, as well as many other models, are compelling but have the unintended consequence of placing default in the realm of predictable events. By predictable, it is meant that the default event is foreshadowed by an observable phenomenon, such as the value of the firm falling dangerously close to its default boundary.

In reality default, or at least the moment at which default is publicly known to be inevitable, usually comes as a surprise. This is highlighted in the credit market by the prevalence of positive short-term credit spreads. If default were truly predictable, the term structure of credit spreads would decrease to zero with maturity. The prediction of zero short-term spreads is one of the difficulties with traditional structural models.

In contrast to the structural approach, the reduced form approach is based on the assumption that default is totally unpredictable; i.e. it hits the market by surprise. In a reduced form model, each firm comes equipped with an intensity, or conditional default arrival rate. The intensity $\lambda(t,\omega)$ is a function of time t and state of the world $\omega$. It is the instantaneous rate of default, given that a firm escapes default until time t and is in state $\omega$. It is straightforward to calculate probability of default from the intensity. Further, the intensity is one of the main ingredients in the calculation of prices of default securities. Because of the embedded assumption that default is totally unpredictable, reduced form models can be calibrated to the short positive spreads that are pervasive in the market.

From a modeling perspective, it seems very natural to integrate both approaches, so as to retain both the economic appeal of the structural approach and the empirical plausibility as well as the tractability of the intensity-based approach. However, to integrate both approaches is very difficult because of conflicting assumptions underlying the better known structural models and reduced form models. Thus, the most basic structural/reduced form hybrid models are fundamentally flawed.

It should be appreciated that for the purpose of measuring default risk, neither approach explicitly accounts for the fact that investors rely on information that is imperfect. It would therefore be advantageous to provide a framework directly addressing this issue.

It would further be advantageous to provide a computer implemented method and apparatus that provides a hybrid default model that incorporates the best features of both traditional structure and reduced form approaches while avoiding their shortcomings and such that the assumptions underlying the component models are compatible.

SUMMARY OF THE INVENTION

A method and apparatus for developing a structural/reduced form hybrid model of credit risk that incorporates the short-term uncertainty inherent in default events is disclosed. The model is based on the assumption of incomplete information, taking as premise that bond investors are not certain about the true level of a firm's value that may trigger default. In addition, the coherent integration of structure and uncertainty is facilitated with compensators. Compensators form the infrastructure of a class of credit models that is broad enough to include traditional structural models, intensity-based models, and a great deal more. Several empirical examples are provided that compare default probabilities and credit yield spreads forecast by the incomplete information model to the output of a Black and Cox (1976) model. It is found that the incomplete information model reacts more quickly and, unlike traditional structural models, forecasts positive short-term credit spreads for firms that are in distress. It is also demonstrated that while the model is predicated on the surprise nature of default, it does not have a conditional default rate.

DETAILED DESCRIPTION OF THE INVENTION

Figure 1:
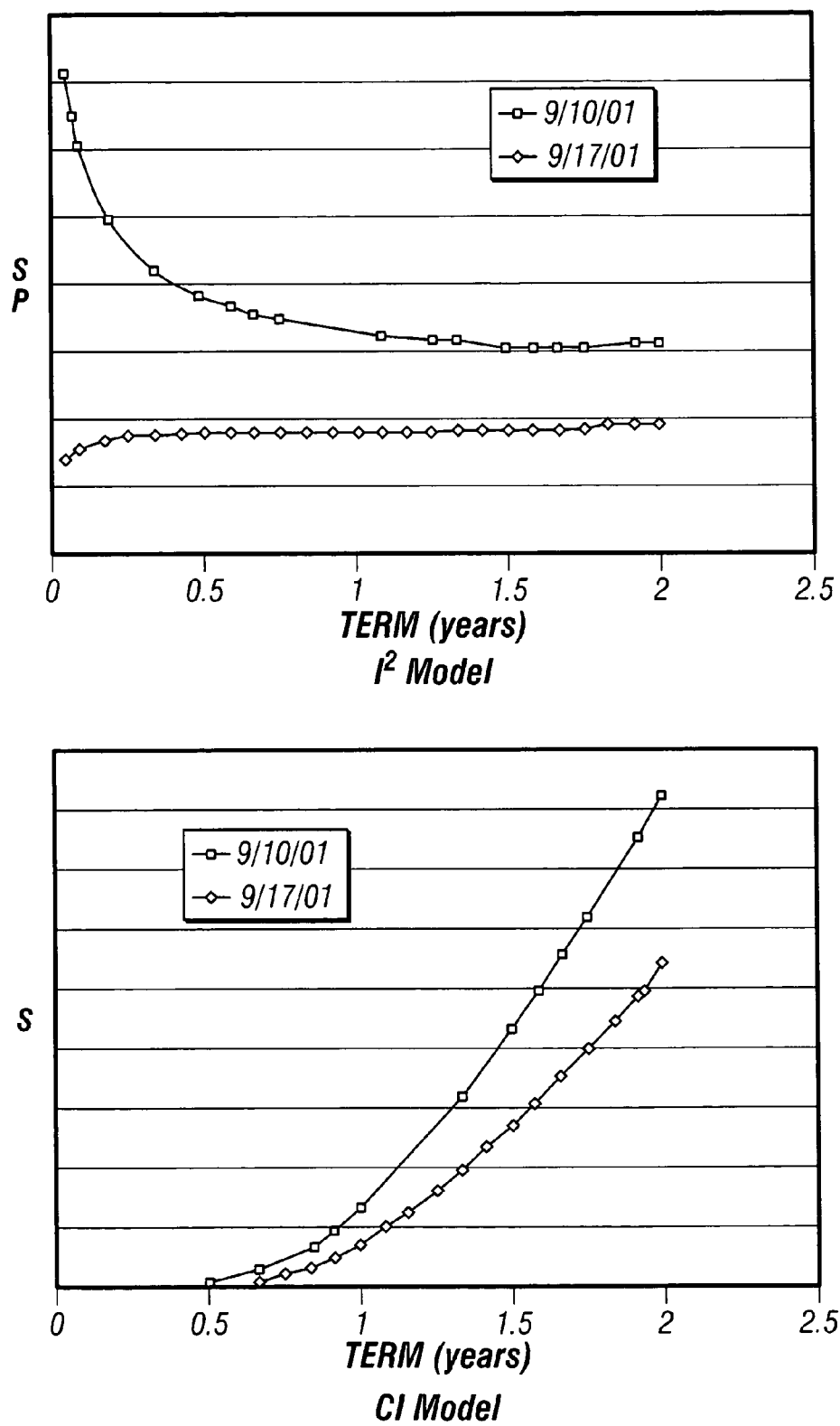
FIG. 1 is a graphical diagram showing model forecasts of United Airlines' term structure of credit spreads forecasted by the $I^2$ model according to the invention and a complete information (CI) model before and after the 9/11 attack.

A method and apparatus for developing a structural/reduced form hybrid model of credit risk that incorporates the short-term uncertainty inherent in default events is provided. The model is based on the assumption of incomplete information, taking as premise that bond investors are not certain about the true level of a firm's value that may trigger default. In addition, the coherent integration of structure and uncertainty is facilitated with compensators. Compensators form the infrastructure of a class of credit models that is broad enough to include traditional structural models, intensity-based models, and a great deal more. Several empirical examples are provided that compare default probabilities and credit yield spreads forecast by the incomplete information model to the output of a Black and Cox (1976) model. It is found that the incomplete information model reacts more quickly and, unlike traditional structural models, forecasts positive short-term credit spreads for firms that are in distress. It is also demonstrated that while the model is predicated on the surprise nature of default, it does not have a conditional default rate.

A key insight in understanding most investment decisions is that such decisions are based on incomplete information. This disquieting fact, whose origins range from the complex nature of our economic environment to sneaky corporate practices, flies in the face of the assumptions that underlie many credit models. Nevertheless, a framework to model credit in the context of incomplete information is of surprisingly recent vintage. See, for example, Duffie and Lando, *Term Structures of credit spreads with incomplete accounting information*, Econometrica 69(3), pages 633-644 (2001), Giesecke, *Default and information*, working paper, Cornell University (2001), and Cetin, Jarrow, Protter and Yildirim (2002), *Modeling credit risk with partial information*, working paper, Cornell University.

Overview of an Exemplary Hybrid Model, $I^2$ $I^2$ Model

One preferred embodiment of the invention provides a structural/reduced form hybrid default model based on incomplete information. This model, hereinafter denoted $I^2$, is a first passage time model: it assumes that a firm defaults when its value falls below a barrier. First passage time models are widely used because they take account of the empirical fact that default can occur at any time.

First passage time models require descriptions of both firm value and a default barrier. According to the invention, the provided $I^2$ model assumes investors do not know the default barrier. Such assumption is a more realistic assumption than found in most structural models. For example, the importance of modeling uncertainty about the default barrier is highlighted by high profile scandals at Enron, Tyco and WorldCom, as well as the 919 U.S. accounting restatements reported by the General Accounting Office in the past four years. In these cases, public information led to poor estimates of the default barrier.

In one embodiment of the invention, $I^2$ is a structural/reduced form hybrid model of credit risk that is capable of generating conditional probabilities of default and prices of credit sensitive securities.

Some Economic Premises.
1. $I^2$ is a first passage time model. Default occurs when the value of the firm falls below a barrier.
2. Incomplete information: Investors do not know the value of the barrier that will trigger default.
3. Firm value is the sum of equity and debt.

Exemplary Features of $I^2$.
1. $I^2$ is a tractable, mathematically coherent structural/reduced form hybrid model that incorporates the best features of both traditional approaches while avoiding their shortcomings.
   $I^2$ is consistent with the positive short term spreads that are prevalent in the market.
   $I^2$ incorporates any of:
     Jumps in security prices at default;
     Credit risk premium; and
     Uncertainty about recovery.
2. The calculations of $I^2$ default probabilities are based on compensators, which are generalized integrated intensities.

$I^2$ Model Ingredients.
One embodiment of the invention incorporates the following:
1. Implementing the definition of default according to first passage time modeling;

2. Implementing the firm value prior to default as a geometric Brownian motion model; and
3. Defining the default barrier as distributed, and, specifically as a scaled beta distribution. In one embodiment of the invention, such distribution is updated daily and scaled such that short spreads are positive when a firm's leverage ratio is at an historical high. The mean and variance of the default barrier are functions of the long and short term debt.

It should be appreciated that a model that purports to have an uncertain default barrier need not be an incomplete information model and need not incorporate the distinguishing features of $I^2$. In fact, such model can be a complete information model. The $I^2$ model is based on a two-dimensional model of uncertainty. Other models that include uncertain default barriers but are based on a one-dimensional model of uncertainty are subject to the same shortcomings that plague the Merton and Black-Cox models, which are complete information models.

Short Spreads

According to the preferred embodiment of the invention, short spreads are modeled more accurately. Refer to FIG. 1 which is a graphical diagram showing model forecasts of United Airlines' term structure of credit spreads forecasted by the $I^2$ model according to the invention and a complete information (CI) model before and after the 9/11 attack. As markets re-opened, equity dropped abruptly generating jumps in the credit spreads forecast by both the $I^2$ and the traditional first passage time model, CI.

Even after the drop, the credit curve generated by the CI model becomes flat and tends to zero at short maturities. This does not come from unusual model inputs. Rather, such effect is the result of an implicit CI model assumption that default can be anticipated. The CI model and many other structural models assume that the distance to default is known. This has unintended consequences. For example, such assumption can produce a forecast that, in the next instant, establishes that United Airlines and the U.S. government are equally credit risky.

It should be appreciated that both the provided $I^2$ model of the invention and reduced form models contain the opposite assumption. That is, both the provided $I^2$ model of the invention and reduced form models assume default cannot be anticipated. As a consequence, the $I^2$ forecasts positive short-term spreads when the possibility of default is imminent. $I^2$ acts like a reduced form model as it can be fit to the positive short spreads that are pervasive in the market.

Historical Leverage Input

It should be appreciated that historical leverage information enhances reactivity. Leverage, the ratio of a firm's debt to its value, is a key input to most structural credit models. The $I^2$ and CI models are not exceptions. However, in one embodiment of the invention, the $I^2$ model incorporates the history of a firm's leverage, not just its current value. Such incorporation makes the $I^2$ model more reactive.

Figure 2:
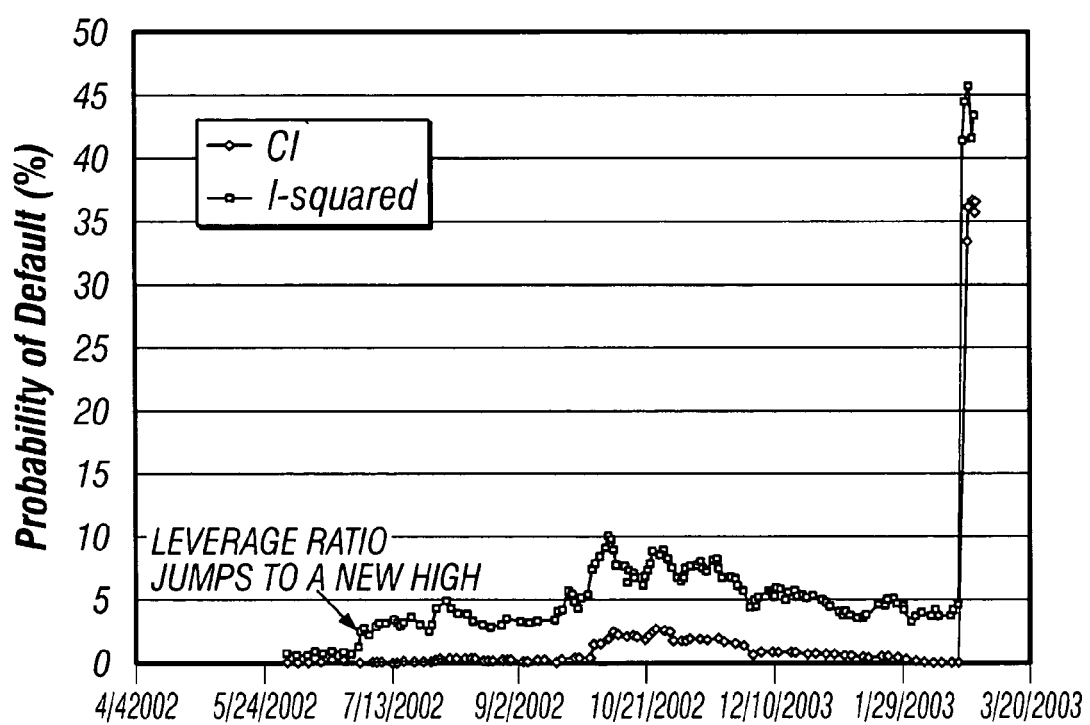
FIG. 2 is a graph showing one-year default probabilities spanning the second half of 2002 for the Dutch company Royal Ahold according to the invention and relative to a CI model.

The height of the default barrier, which is its largest possible value, is a function of the maximum historical leverage ratio. In one embodiment of the invention, when a firm first hits an historically high leverage ratio, short-term forecasts jump up because the model allows that the distance to default might be arbitrarily small. When the leverage ratio falls from its historical high, the distance to default acquires a positive lower bound and short-term forecasts jump down. The greater reactivity of the $I^2$ model relative to the CI model is illustrated in FIG. 2, a graph showing one-year default probabilities spanning the second half of 2002 for the Dutch company Royal Ahold. In February 2003, Ahold admitted to overstating $500 million in earnings and to other "accounting irregularities." The early reaction time of the $I^2$ model relative to the CI model is evident.

Calibrating th $I^2$ Model

In one embodiment of the invention, an investor can intelligently modify forecasts. Both the expected default barrier and the uncertainty around it can be calibrated to available information in the $I^2$ model. For example, suppose a firm is believed to be in good financial health but that a particular analyst thinks otherwise. Such analyst can increase the forecasts to line up with his views by raising the expected value of the barrier. The analyst can also adjust the variance of the default barrier, for example, to the level of his confidence in reported levels of firm liability.

Figure 3A:
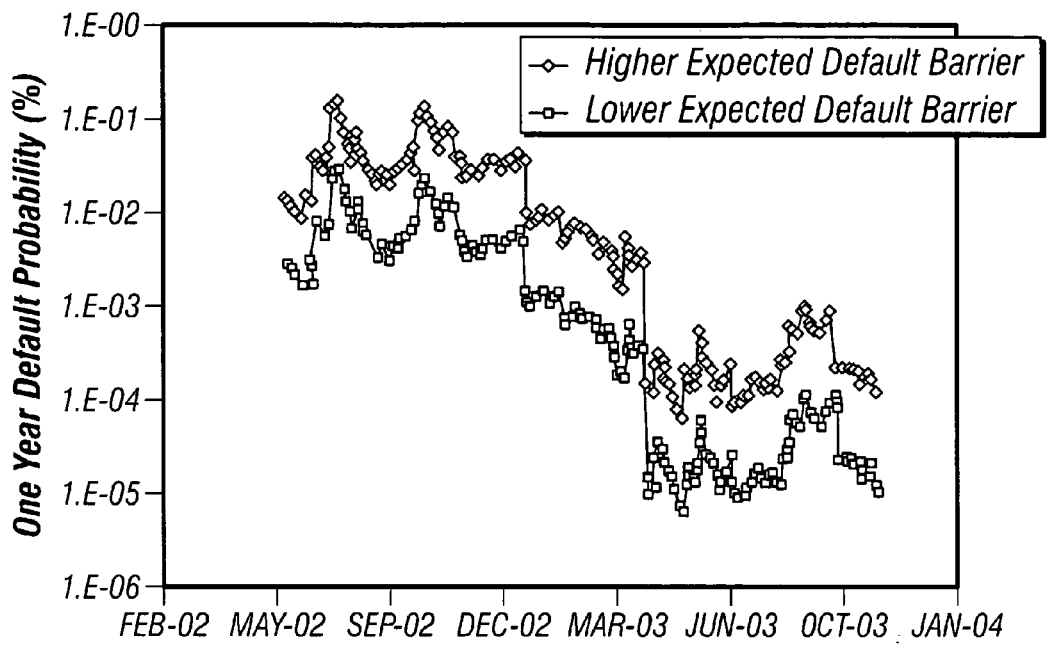
FIG. 3 is a graphical illustration of uncertainty around the default barrier according to the invention.
Figure 3B:
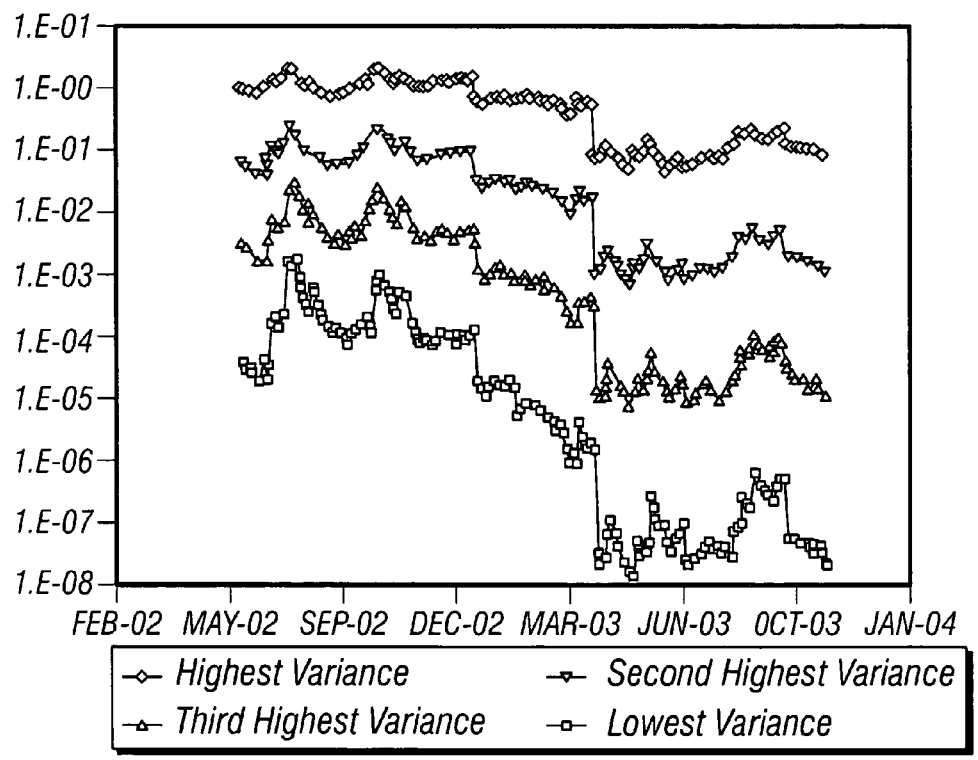

Refer to FIG. 3, graphical illustration of uncertainty around the default barrier according to the invention, for illustrated impacts of changing these two parameters on one-year default forecasts for Pfizer. In FIG. 3a, the uncertainty around the default barrier is fixed but the expected value of the default barrier changes. For example, a manager with a more conservative view can raise the level of the default barrier and the model forecasts a correspondingly higher level of default. In FIG. 3b, the expected default barrier value is fixed and the uncertainty around the default barrier changes. For example, a manager with a less confident outlook can increase the uncertainty around the default barrier value. It should be appreciated that because Pfizer appears to be in good financial health, the probability forecasts are relatively low and are plotted on a logarithmic scale for readability.

An Exemplary Technique for Evaluating the Accuracy of Default Forecasts

One embodiment of the invention provides a unique technique for evaluating the accuracy of default forecasts. Default forecasting models make two types of errors, namely a false negative and a false positive. A false negative, which is often perceived as the more dangerous of the two types, is an actual default not forecasted by the model. If the model forecasts default but the firm survives, such error is a false positive. However, false positives are also very dangerous as well because false positives undermine the power of correct forecasts. Consider a model that forecasts default for every firm. This model has no false negatives. It correctly identifies every default, but it puts forth an abundance of false positives which render such model useless.

Such embodiment of the invention minimizes both types of errors. In addition, the embodiment of the invention includes a power ratio of true positives to false positives. Thus the invention provides sound model evaluation.

In one embodiment of the invention, to evaluate the power ratio of the $I^2$ model, the default probability forecast over a given horizon is converted to a binary forecast. This is achieved by labeling forecasts below a fixed cutoff as "no default" and forecasts equal to or above such cutoff as "default." According to one embodiment of the invention, the cutoff value is allowed to vary because it is arbitrary. One form of output according to the invention is a resulting receiver operating characteristic (ROC) curve, or power curve. Such power curve is a standard statistical test of decision-making tools.

Figure 4:
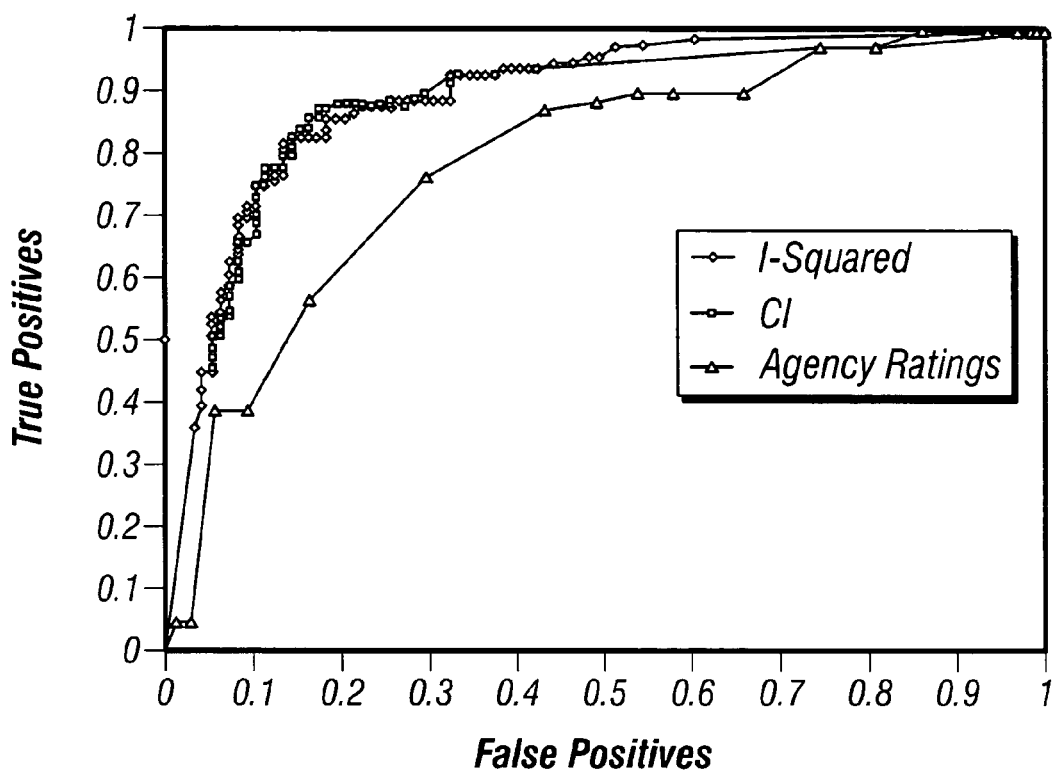
FIG. 4 is a graphical representation of true positives to false positives according to the invention.

Example ROC tests of the forecasts of default by the $I^2$ model, the CI model, and agency ratings are illustrated in FIG. 4, a graphical representation of true positives to false positives according to the invention. In FIG. 4, true positives are plotted against false positives as the cutoff value varies. It should be appreciated that in FIG. 4, the slope of the curve at any point is the power ratio for the cutoff that determines the point. A steeper curve indicates a more powerful model. Both the $I^2$ and CI models have greater predictive power than agency ratings. Further, the ROC curves for the $I^2$ and CI models are extremely close, demonstrating that the reactivity and flexibility of the $I^2$ model do not come at a price of diminished forecasting power.

Credit Sensitive Security Pricing Under $I^2$

According to one embodiment of the invention, implementations of the $I^2$ model can be extended to account for components of credit other than default forecasts. For example, there is more to credit risk than default forecasts. Reliable default probability forecasts are a valuable investment decision tool. For example, such forecasts can be used to screen assets in a portfolio or to indicate which securities to hedge in a synthetic index. However, default probability is only one of several factors that can be used to price securities or to evaluate credit risk. For example, defaultable security prices incorporate a credit risk premium, which is the extra compensation required by investors for taking a credit risk, as well as include market estimates of post-default recovery. Incomplete information models provide a way to incorporate both these ideas.

Giesecke and Goldberg, *The market price of credit risk*, working paper, Cornell University(2003), and Giesecke and Goldberg, *The market price of credit risk*, U.S. Patent Application No. 60/505,532 filed Sept. 23, 2003, show an exemplary extension of the $I^2$ model to price defaultable securities. Such extension takes into account the abrupt drops in security values that accompany default. It also includes a decomposition of the credit risk premium into two economically meaningful components. The first component is associated with the variation in firm value prior to default. The second component comes from the jumps in prices that happen at default. The two components of the credit risk premium and implied recovery rates can be disentangled and extracted from market prices of defaultable securities. Thus, they can be integrated into portfolio risk forecasts and hedged separately.

An Exemplary $I^2$ Model Using Compensators as Facilitators

Overview of the Underlying Mathematics

The mathematical calculations associated with incomplete information models are expressed in terms of compensators. These are processes that depend explicitly on an information structure, or filtration.

Incomplete information models are fully developed in Giesecke, Kay, *Default and Information*, working paper, Cornell University (2001). Many incomplete information models are compatible with the reduced form approach in that they implicitly define and intensity. However, it is both interesting and subtle that there are incomplete information models predicated on the surprise nature of default for which intensities do not exist. These are generalized reduced form models and one preferred embodiment of $I^2$ is an example.

Compensators facilitate a unified perspective on both reduced form models and traditional structural models.

Following is an outline of a small part of the theory of incomplete information models and compensators. Subsequently, hereinbelow is a comparison between the $I^2$ incomplete information model described above and the Black and Cox structural model, a complete information model. From a distance, the forecasts of the calibrated models appear similar. However, there are important differences including:

$I^2$ reacts more quickly because it takes direct account of the entire history of public information rather than just current values.

$I^2$ predicts positive short spreads for firms in distress. The Black-Cox model, as set forth in Black, Fischer, Cox (1976), *Valuing corporate securities: Some effects of bond indenture provisions*, Journal of Finance 31, 351-367 (1976), and most traditional structural models always predict that short spreads are zero.

The Mathematics

The Default Process

A default process is a stochastic process, or time dependent random variable, that is zero until a firm defaults at which time the process jumps to one and stays there forever.

Figure 5:
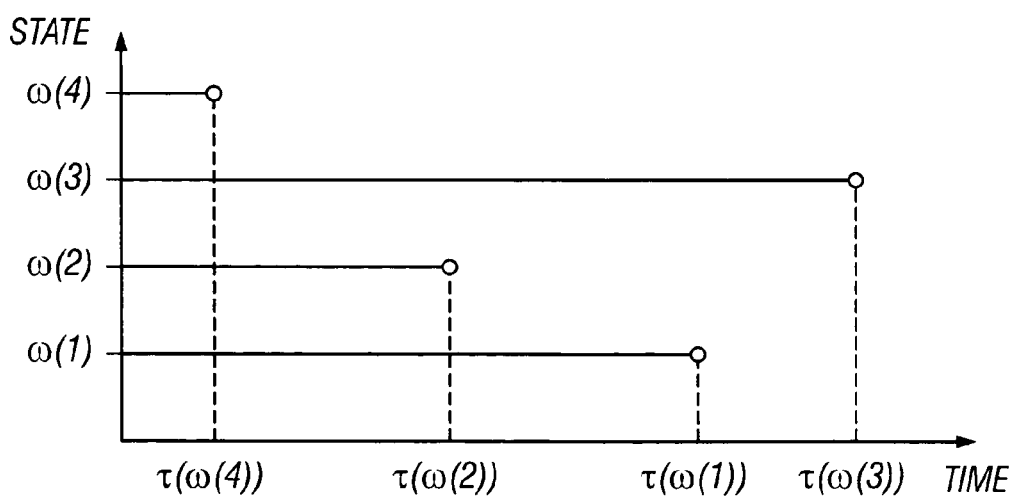
FIG. 5 is a schematic view of the default process according to the invention.

FIG. 5 shows a schematic view of the default process as a function of the state $\omega \in \{\omega(1), \omega(2), \omega(3), \omega(4)\}$ according to the invention. For example, if the state of the world is $\omega(2)$, then the default appears at time $\tau(\omega(2))$, at which the default process jumps from zero to one. Of all possible states, $\omega(4)$ could be considered the worst, because the default appears earliest.

Despite the fact that this process takes on only two values, it can be quite complex. The jumps, which occur at different times depending on the state of the world, might occur on a complicated set. However, there is an upward trend that makes the situation tractable. This trend can be used to estimate default probabilities and to value credit-sensitive instruments.

Following is a description of the situation in a special case of great importance. This example assumes the default probabilities are known. As such, it lays out the theoretical framework in a simple setting.

For t>0, let F(t) be the probability of default before time t. In other words, if $\tau(\omega)$ is the time of default in state $\omega$, then $P[\tau(\omega) \leq t]$. Because there is some chance that a firm will survive beyond any fixed time, the probability F(t) that default occurs before time t is strictly less than 1. Note that the function F carries no information about which states of the world are in default. It merely tells what fraction of states have defaulted by a given time.

Suppose F is continuous and consider the function $$A(t) = -\log(1 - F(t)) \qquad (1)$$

The function A(t) is called the pricing trend of the default process. Of course, formula (1) can be easily inverted to emphasize that the pricing trend contains everything needed to know about default probabilities:

$$F(t) = 1 - e^{-A(t)} \qquad (2)$$

In practice, the default probabilities are not known. However, as explained hereinbelow, it is possible to use observable information to model the pricing trend. It should be appreciated that the pricing trend can be analyzed directly with the mathematical theory of compensators. The compensator of a default process or of any non-decreasing process is a simpler process characterized by three important properties. It should further be appreciated that more generally, it can be shown that a compensator exists uniquely for any uniformly integrable submartingale. This is a consequence of the Doob-Meyer decomposition, see e.g. C. Dellacherie, P. A. Meyer, *Probabilities and Potential*, North Holland, Amsterdam (1982) for details.

The first property is that changes in the compensator mirror, on average, changes in the default process. In precise terms, this can be stated as follows.

Property 1. The difference between the underlying process and its compensator is a martingale.

It should be appreciated that a martingale is a stochastic process that is fair in the sense that in every state of the world and at every future time, the expected gain or loss is zero.

The second defining property is monotonicity:

Property 2. The compensator is non-decreasing.

Finally, the values of a compensator process are always foreshadowed or announced by values at earlier times.

Property 3. The compensator is predictable, even if the underlying process is not.

According to the invention, compensators are used to generate pricing trends such that default probabilities can be calculated as in equation (2) and value credit-sensitive instruments can be calculated. However pricing trends can also be used to generate compensators and, as for the chicken and the egg, both aspects of the relationship are important. The properties of the compensator generated by the pricing trend are used to deduce the probabilistic properties of default.

To illustrate the relationship, consider the deterministic process F defined by the default probability F(t). Because there is no uncertainty about F, it is predictable and it is non-decreasing by construction. Consequently, properties 1-3 imply that the process F is equal to its own compensator.

By definition, the pricing trend of the default process is equal to the negative logarithm of 1 minus the compensator of the deterministic process F. In other words, it is given by equation (1).

Now consider any default process whose default probabilities are given by F. The compensator $A^\tau$ of the default process is equal to A(t) before default and A($\tau(\omega)$) in state $\omega$ afterwards:

$$A^\tau(t,\omega) = A(t \hat{} \tau(\omega)) \qquad (3)$$

where it is written $a\hat{}b = \min(a,b)$ for the minimum of a and b. In other words, the compensator of the default process $A^\tau$ is equal to the pricing trend A of the deterministic process F stopped at default. With equation (1) the following holds, of course $$A^\tau(t,\omega) = -\log(1 - F(t \hat{} \tau(\omega))) \qquad (4)$$

Figure 6:
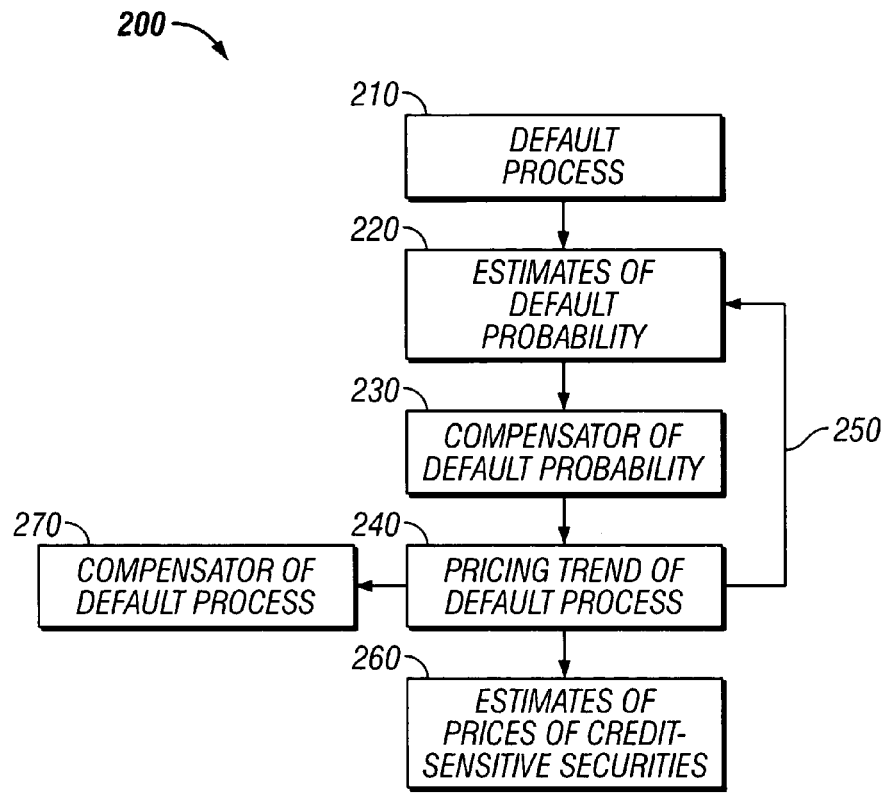
FIG. 6 is a block diagram showing the relationship between the default process, the default probability and its compensator, as well as the pricing trend and the compensator of the default process according to the invention.

Referring to FIG. 6, a flowchart 200 representing the relationship between the default process, the default probability and its compensator, as well as the pricing trend and the compensator of the default process according to the invention is shown. More specifically, FIG. 6 shows a step 210 representing the default process, the output if which is input into a step 220 representing a computed default probability. A step 230 represents using the calculated default probability of step 220 to determine the compensator of the default probability. Step 240 represents the pricing trend being generated by the compensator of the deterministic default probability process of step 230. The compensator of the deterministic default probability process of step 230 is used to calculate forecasted default probabilities represented by step 250 and to calculate prices of credit sensitive derivatives. The pricing trend of the default process represented by step 240 can also be combined with survival information to generate the compensator of the default process represented by step 270.

Two Examples

Following are two examples of default processes and their associated compensators according to the invention. In the first example, a firm that is certain to default three months hence. In this case, the default process and its compensator are the same. In all states of the world, the default indicator stays zero for three months at which time it jumps to one and stays there forever. For the second example, consider a firm whose time to default $\tau$ is uncertain and distributed exponentially with an average of 10 years. Here, the pricing trend of the default process is given by the deterministic process t/10. The compensator of the default process is a stochastic process equal to the trend before default and equal to the constant $\tau(\omega)/10$ after default at $\tau(\omega)$.

Note that in the first example, default is completely predictable and the jumps in the default process give rise to jumps in the compensator. In the second example, default is completely unpredictable and the compensator of the default process is continuous. This equivalence is a general property of default processes.

Theorem 1. The compensator of the default process is continuous if and only if default is completely unpredictable.

This theorem is a well known result in the field of stochastic processes; see, for example, Dellacherie and Meyer (1982). It merits special attention since it equates a probabilistic attribute with an analytical one.

Information: What do investors really know?

Compensators, and thus pricing trends, depend both on the underlying process and a supporting structure that keeps track of the information acquired as time passes. In the subject of stochastic processes, the information structure is a filtration.

How then, were compensators and pricing trends created in section hereinabove without specifying the information structure? The answer is that the information generated by the underlying processes was implicitly used. For example, consider that by the time the default process has evolved to a future time t, the information regarding which states of the world have witnessed default by time t and when these defaults occurred, is known. This survival information structure is the minimal information structure fully compatible with the default process.

Of course, investors do not know how the default process evolves. If they did, there would be no need for a pricing trend: all default contingent securities could be priced from the default process.

However, the bare-bones theory outlined in section hereinabove can be reworked with an eye toward the information that is available to an investor. For example, such can include histories of equity prices, debt outstanding, agency ratings, and accounting variables. Such information is used to generate a new pricing trend according to the invention. This new pricing trend differs from the one in the section hereinabove in that it is not defined directly in terms of the default probabilities. However, it is analogous in the sense that it can be used to estimate default probabilities and to price credit-sensitive instruments.

The initial object of interest is now the conditional probability of default by time t, denoted F(t,$\omega$), given the information available to investors at time t. The subsequent provides an explicit structural model for this conditional default probability. For now the general setting is continued as follows.

To keep matter simple and instructive, suppose that F(t,$\omega$) is monotone and continuous. Now the situation is similar to that section hereinabove, i.e. properties 1-3 imply that F(t,$\omega$) is equal to its own compensator. The pricing trend of the default process is then given by $$A(t, \omega) = -\log(1 - F(t, \omega)) \qquad (5)$$

Note that equation (5) is the counterpart to equation (1). In general, F(t,$\omega$) may not be continuous or monotone. In either case, the full strength of Theorem 4.1 in Giesecke (2001) can be used to, calculate the pricing trend in terms of the non-trivial compensator of F(t,$\omega$).

The compensator $A^\tau$ of the default process is, again in analogy to the section hereinabove dealing with the trivial information structure, given by the pricing trend A stopped at default:

$$A^\tau(t,\omega) = -\log(1 - F(t \wedge \tau(\omega), \omega)) \tag{6}$$

From a risk measurement and management perspective, of interest are unconditional default probabilities $F(t)=P[\tau(\omega) \leq t]$. There is in fact a general relation between F(t) and the pricing trend $A(t,\omega)$, which parallels equation (2) associated with the trivial information structure:

$$F(t) = 1 - E[e^{-A(t,\omega)}] \tag{7}$$

It should be appreciated that for such relation as in equation (7) to hold the pricing trend is continuous and the process defined by $E[e^{-A(t,\omega)}]$ is continuous at the default time $\tau$.

This shows that the pricing trend contains everything needed about default probabilities. There is of course an alternative route for arriving at F(t): average conditional default probabilities as follows:

$$F(t) = E[F(t,\omega)] \tag{8}$$

Prices of credit-sensitive instruments can be directly expressed in terms of the pricing trend, as shown in Giesecke (2001). Consider for example a corporate zero-coupon bond which promises to pay one dollar at some future time t. Suppose that in case of issuer default there is zero recovery. Letting r denote risk-less interest rates, then the price p(t) of this bond today is as follows $$p(t) = E\left[e^{-\int_0^t r(s,\omega)ds - A(t,\omega)}\right] \tag{9}$$

where here $E[\bullet]$ denotes risk-neutral expectation.

It should be appreciated that again, for this relation to hold the pricing trend needs to be continuous and the process defined by $$E\left[e^{-\int_0^t r(s,\omega)ds - A(t,\omega)}\right]$$

needs to be continuous at the default time $\tau$.

Figure 7:
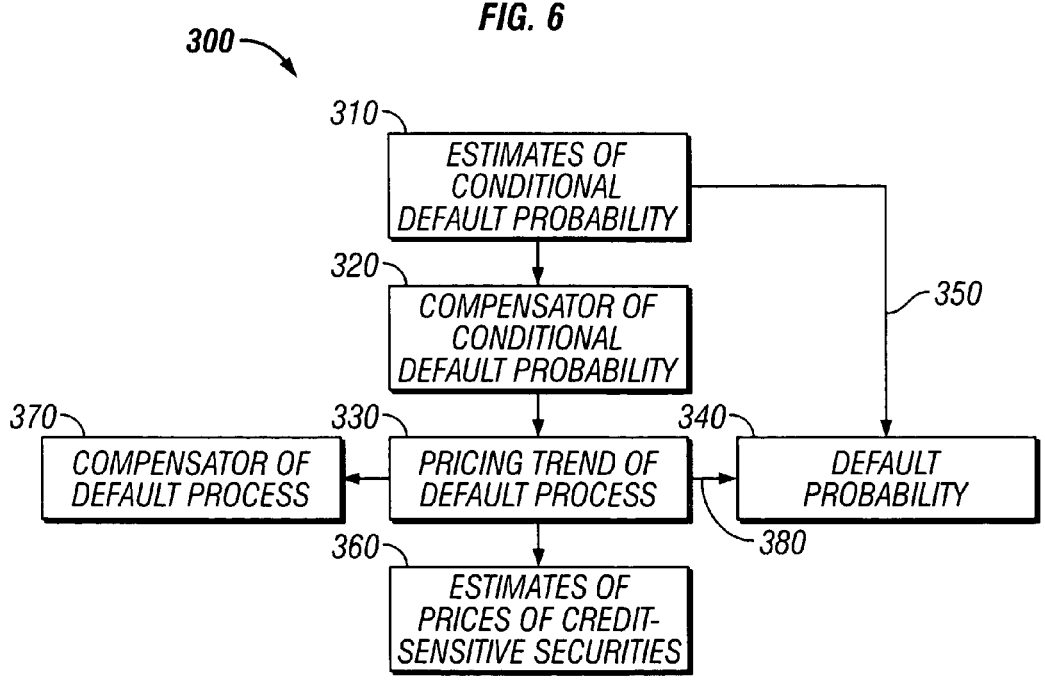
FIG. 7 is a block diagram showing the relationship between the conditional default probability and its compensator, the default probability, as well as the pricing trend and the compensator of the default process according to the invention.

Referring to FIG. 7, a flowchart 300 representing a schematic diagram of the construction of compensator-based credit models according to the invention is shown. More specifically, the first step 310 is to determine the conditional default probability. Then, step 320 represents using the conditional default probability to determine the compensator of conditional default probability. A step 330 represents the pricing trend of the default process being generated by the compensator of the conditional default probability process of step 320. The pricing trend of the default process is used to forecast default probabilities represented by step 340 and to calculate the prices of credit sensitive derivatives represented by step 360. The pricing trend of the default process of step 330 can also be combined with survival information to generate the compensator of the default process represented by step 370. It should be appreciated that the conditional default probability determined in step 310 is used, represented by step 350, to determine the default probability of step 340. Likewise, the pricing trend of the default process of step 330 can also be used, represented by step 380, to determine the default probability of step 340.

Calculating Default Probabilities and Prices of Credit Sensitive Securities

The model assumptions of the invention imply that at a future time t, the information about the minimum firm value witnessed by time t in every state of the world is known. Further, the conditional probability of default by time t is equal to the probability that the minimum firm value $m(t,\omega)$ seen by time t in state $\omega$ is below the default barrier. In other words, $$F(t,\omega) = 1 - G(m(t,\omega)) \tag{10}$$

where G is the continuous cumulative distribution function of the default barrier. It should be appreciated that $F(t,\omega)$ is monotone and continuous.

Having an explicit expression for conditional default probabilities facilitates the calculation of the pricing trend along the lines of equation (5).

Theorem 2. When information on the firm value process is available, the pricing trend of the default process is given by $$A(t,\omega) = -\log(G(m(t,\omega))) \tag{11}$$

Unconditional default probabilities $F(t) = P[t(\omega) \leq t]$ can be obtained from equation (7) together with Theorem 2:

$$F(t) = 1 - E[G(m(t,\omega))] \tag{12}$$

The $I^2$ default risk model allows the pricing of credit sensitive securities. The additional features used are credit risk premium and uncertain recovery value of a security at default. The credit risk premium has two components. The first, denoted $\alpha$, compensates investors for the diffusive risk inherent in the day to day fluctuations in firm value. The second, denoted $\beta$, compensates the investor for the downward jumps in firm value that occur at default.

A credit sensitive security is specified by a payoff date (maturity) T, a possibly uncertain payoff $c_T$ and a stochastic process R representing the recovery at default. In $I^2$, the value of a credit sensitive security with the specification given above is:

$$Y_t = e^{-r(T-t)}E^Q\left[c_T\left(\frac{G(M_T)}{G(M_t)}\right)^{(1+\beta)(1-R^t)}\bigg|\mathcal{G}_t\right], t \leq T. \tag{13}$$

In equation (13) hereinabove, the symbol $M_t$ denotes the minimum of firm value seen by time t. It is a function of the diffusive credit risk premium $\alpha$.

Two Exemplary Embodiments of the Invention

Following are two embodiments of the invention. The first embodiment of the invention gives estimates only of default probabilities. The second embodiment of the invention gives estimates of several additional credit risk factors.

It should be appreciated that both embodiments are updated daily and both have a two-step procedure. In the first preliminary step, historical information is used to calibrate the parameters of the default barrier. The second and final step outputs the default probabilities and the other credit risk factors.

A First Exemplary Embodiment of the Invention

Figure 8:
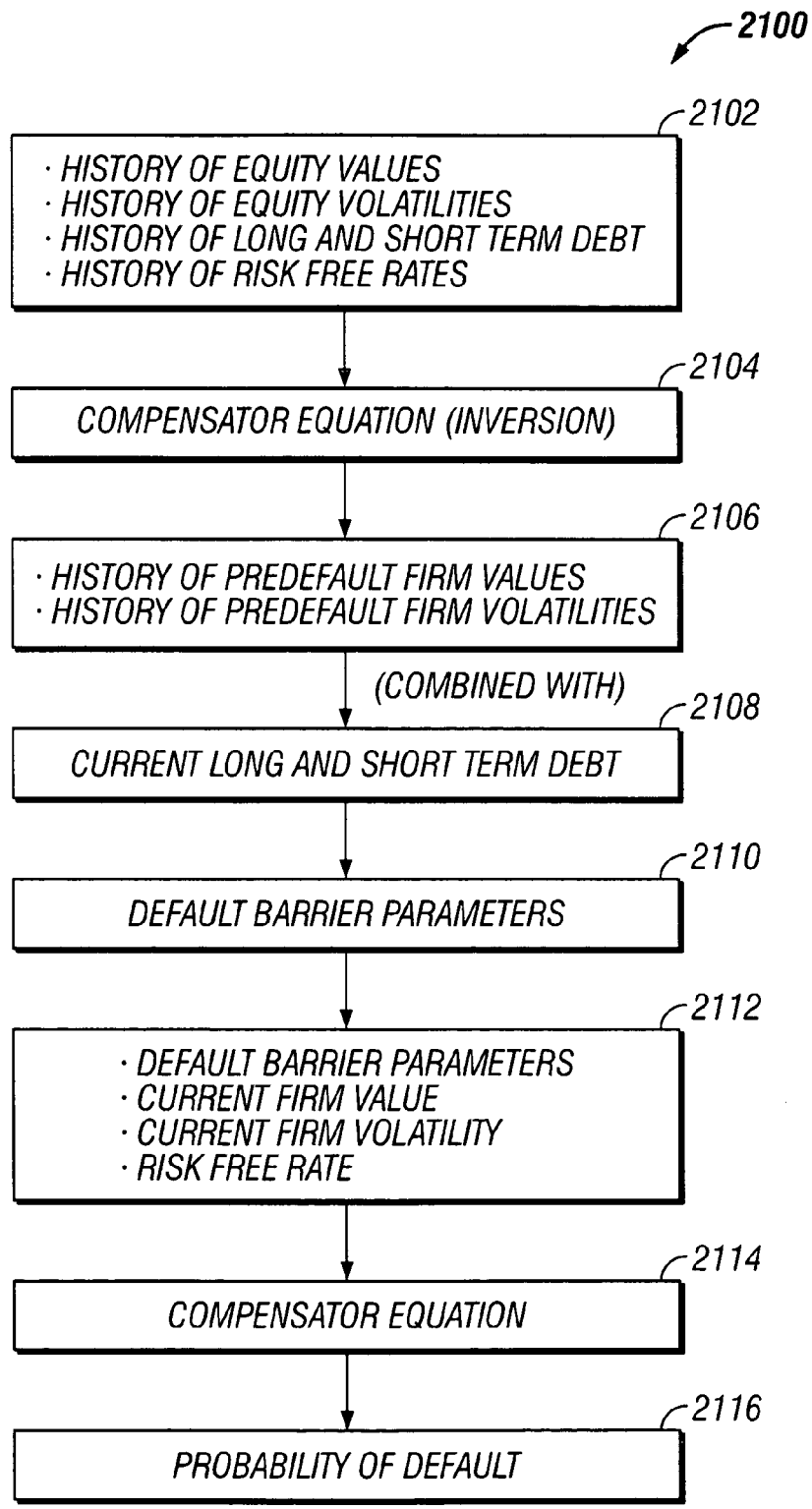
FIG. 8 is a flow diagram for calculating default probabilities according to the invention.

A first exemplary embodiment of the invention is described with reference to FIG. 8, a flow diagram for calculating default probabilities 2100 according to the invention. The basis of this embodiment of the invention is a system of two equations in two unknowns that express equity value and equity volatility in terms of firm value, firm volatility, the default barrier, and a risk free rate. The first equation, which expresses equity value as a function of firm value, firm volatility, the default barrier, and risk free rate, posits that equity is a call option on the value of the firm. The second equation, which expresses equity volatility as a function or firm value, firm volatility, the default barrier, risk free rate, and equity value, is derived from the first equation using Ito's Lemma. Each business day, the two equations are inverted 2104 to obtain new values for firm value and volatility and new parameters for the default barrier 2106. Compensator formulae 2114 convert these values to estimates of default probability 2116.

Informational data including history of equity values, history of equity volatilities, history of long term debt and short term debt, and history of risk free rates 2102 are input into compensator equation (13) depicted hereinabove 2104. The result is informational metadata including history of predefault firm values and history of predefault firm volatilities 2106. Such informational metadata 2106 is combined with current long and short term debt data 2108 to determine default barrier parameters 2110: the mean, the variance, and the height.

In this embodiment of the invention, height=(current firm value)/(maximum historical leverage ratio), the mean=current debt, and any of the follow is possible for variance:

(a) variance is calibrated to user information;
(b) variance is set to the unique critical value which separates infinite short spreads from zero short spreads; and
(c) variance is expressed as a function of the ratio of long term to short term debt.

The resulting default barrier parameters 2110 are combined with current firm value, current firm volatility, and a current risk free rate 2112 as input 2114 to a compensator equation, such as that of equation (12). The result is the probability of default 2116.

A Second Exemplary Embodiment of the Invention

Figure 9:
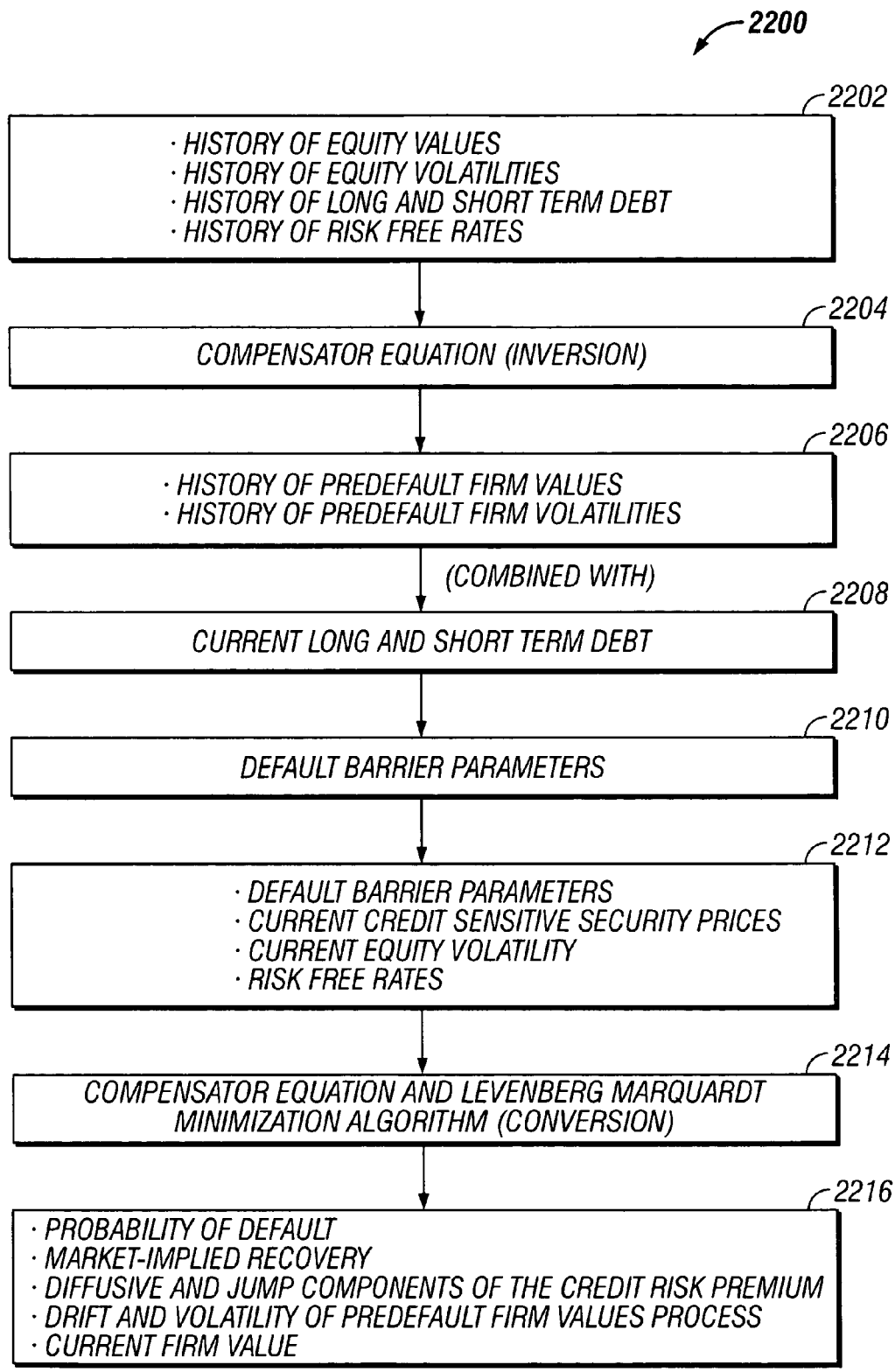
FIG. 9 is a flow diagram for calculating default probabilities and ad other credit risk factors according to the invention.

A second exemplary embodiment of the invention is described with reference to FIG. 9, a flow diagram for calculating default probabilities and other credit risk factors 2200 according to the invention. Informational data including history of equity values, history of equity volatilities, history of long term debt and short term debt, and history of risk free rates 2202 are input into compensator equation (13) 2204. The result is informational metadata including history of predefault firm values and history of predefault firm volatilities 2206. Such informational metadata 2206 is combined with current long term debt and short term debt data 2208 to determine default barrier parameters 2210 as in the first exemplary embodiment of the invention hereinabove. The resulting default barrier parameters 2210 are combined with current credit sensitive security prices, current equity volatility, and current risk free rates 2212 as input to compensator equation (13) and the Levenberg-Marquardt minimization algorithm 2214. The result is the probability of default, the market implied recovery rates, the diffusive and jump (or drop) components of the credit risk premium, the drift and volatility of predefault firm value process, and current firm value 2216.

Empirical Results

To put the model to work, firm specific models of the firm value process and the default barrier distribution are made and carried out in several following examples hereinbelow.

One embodiment of the invention provides an implementation of the incomplete information model described hereinabove takes as input: daily equity prices and Barra equity volatility forecasts, reported liabilities, and risk-free interest rates.

Option pricing formulae are used to convert equity prices and volatilities into the firm values and volatilities used by such implementation.

It is assumed that the default barrier follows a scaled beta distribution, which provides a flexible model for a distribution on a compact interval. The mean and height of the beta distribution are estimated from the history of firm leverage ratios.

The leverage ratio is the present value of the short term debt divided by the value of the firm. It should be appreciated that many variants of this definition are used in practice. A leverage ratio near zero indicates financial health while a leverage ratio approaching one, especially for a firm whose value jumps around a lot, probably means trouble. When the leverage ratio is high, the mean of the beta is quite close to the current level of assets. When the leverage ratio is at an historical high, the invention's model implies positive short spreads, otherwise short spreads are zero. The variance of the distribution is a free parameter that can be used to calibrate the degree of confidence the investor feels about the information that is publicly available. Hence, the invention provides an interactive and user-friendly system.

It should be appreciated that other distributions are apparent to a person skilled in the relevant art without departing from the spirit and scope of the invention. For example, the beta family mentioned above is a huge three parameter family. In addition, the uniform family can also be used, for example.

United Airlines Example

Figure 10:
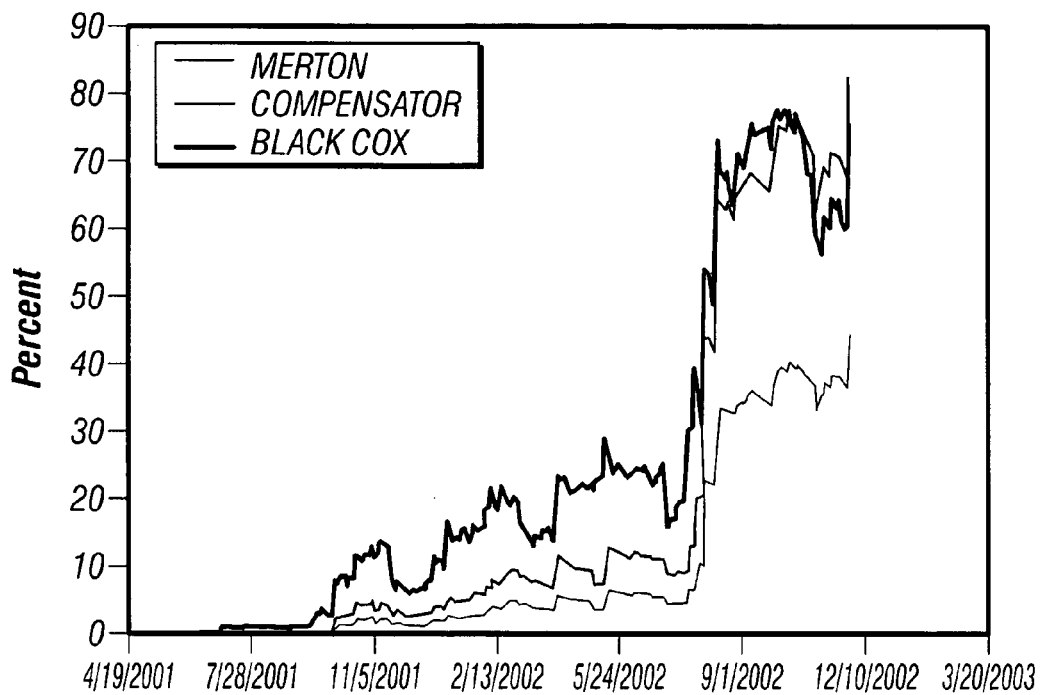
FIG. 10 shows the one year default probabilities for United Airlines whose values are given by the Black-Cox, compensator, and Merton models.
Figure 11:
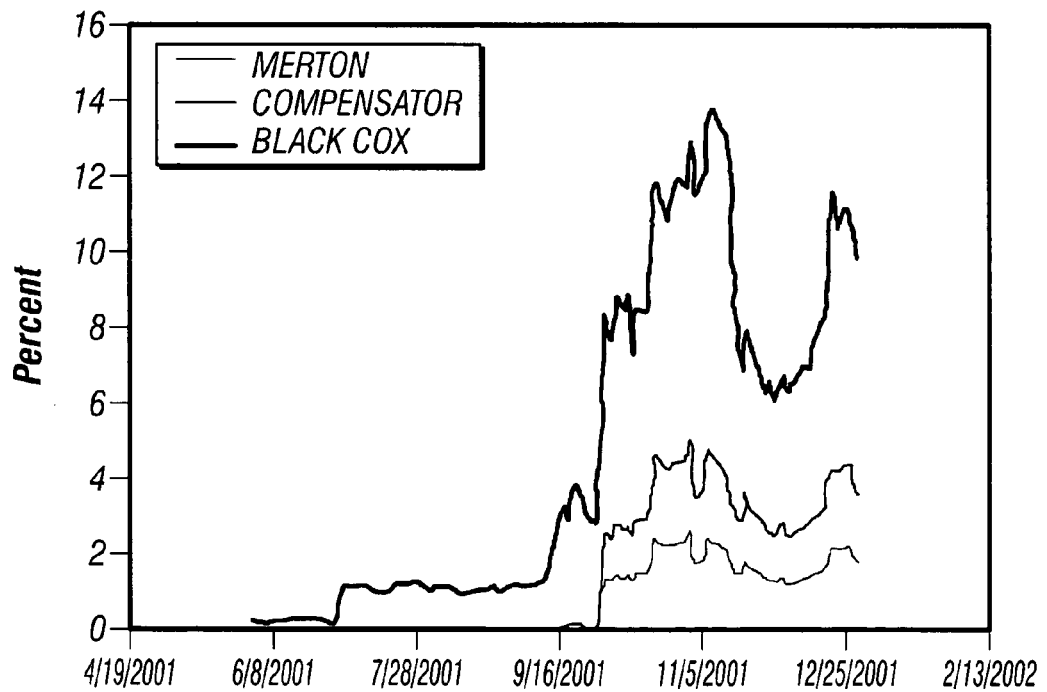
FIG. 11 shows the one year default probabilities for United Airlines, the early part of the study period blown up to highlight the early reaction of the compensator model according to the invention.

Consider the highly publicized example of United Airlines. FIGS. 10 and 11 show time series of one year default probabilities generated by three different models, wherein the default probabilities are based on a risk-free growth assumption and are thus risk-neutral probabilities. The theory given here, combined with estimates for the market price of risk, can yield actual probabilities. The smallest probabilities are generated by the Merton (1974) model. In this model default is triggered if the firm value is below the face value of the debt on its maturity date, which is assumed to be in exactly one year from now. The other two curves are generated by first passage time models, in which the firm may default at any time before the debt matures. These models hence imply default probabilities which are typically higher than those implied by the Merton model. Unsurprisingly, the silhouettes of the curves forecast by the first-passage models are quite similar. The differences between the curves can be understood by examining the differences in the model assumptions. The Black-Cox model posits that the default barrier is known to be the discounted value of the risk free debt. The incomplete information model of the invention assumes the default barrier is not known with certainty. The history of leverage ratios and current level of debt are used to model the default barrier distribution.

The Black-Cox curve generates slightly lower probabilities than the incomplete information model throughout most of the study period. This makes sense: there is more uncertainty built into the incomplete information model. This uncertainty allows for the possibility that the default barrier is closer than publicly advertised. However, the situation reverses in November 2002 when the leverage ratio gets very close to one. Here, the default barrier is so close to the value of the firm that the uncertainty mainly allows for the possibility that the default barrier might not be as close expected. It is reasonable to set an upper bound to the forecast default probability on the grounds that may not be possible to distinguish very risky firms with a model. KMV, for example, sets such an upper bound at 20%.

Refer to FIG. 10 which illustrates one year default probabilities for United Airlines. The values given by the Black-Cox and incomplete information models are higher than the Merton model values.

FIG. 11 illustrates one year default probabilities for United Airlines, wherein the early part of the study period is blown up to highlight the early reaction of the incomplete information model according to the invention.

Figure 12:
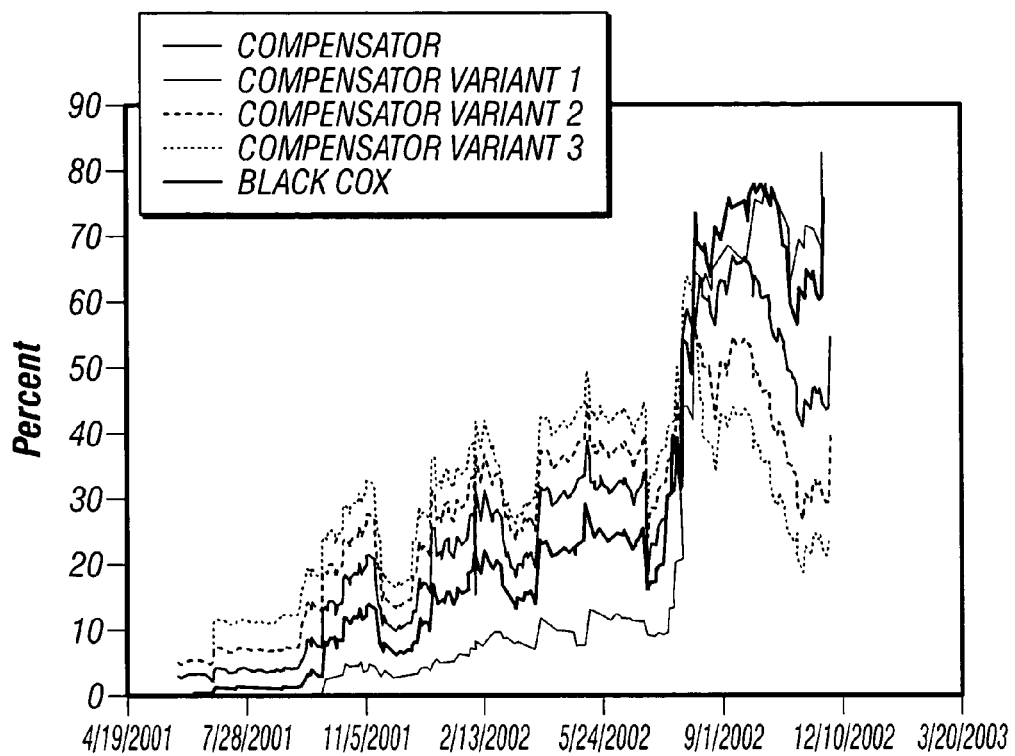
FIG. 12 shows the one year default probabilities for United Airlines forecast by the Black-Cox model along with the incomplete information model and several variants according to the invention.

FIG. 12 shows one year default probabilities for United Airlines forecast by the Black-Cox model along with the incomplete information model and several variants. Before the leverage ratio reached extreme values in November 2002, the higher variance models forecast higher default probabilities as expected. When the leverage ratio is close to one, the opposite behavior is seen. That is, in FIG. 12, the Black-Cox model is displayed along with the provided incomplete information model and several variants. The variants of the pricing trend are generated by increasing the degree of uncertainty about the location of the default boundary. The figure indicates that if the leverage is reasonable, greater uncertainty in the model translates into higher forecast default probabilities. When a firm is near default, the opposite effect is seen. It is possible to change the default barrier distribution in such a way that increasing the uncertainty in the model always increases the forecast default probabilities.

FIGS. 11 and 12 illustrate the fact that the incomplete information models react earlier than the Black-Cox and Merton models. This is because the incomplete information models are sensitive to the entire history of leverage ratios, rather than just the current value.

Figure 13:
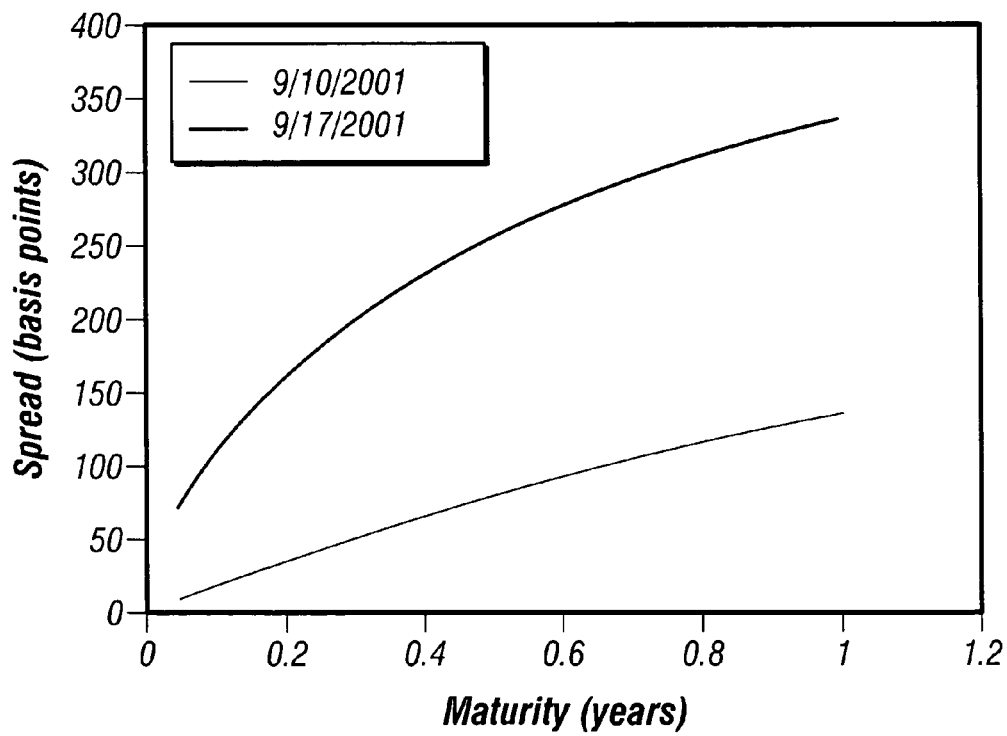
FIG. 13 shows terms structures of default probabilities for United Airlines immediately before and after the attack on the World Trade Center according to the invention.

Sep. 17, 2001 was the first trading day after the World Trade Center was attacked and destroyed. On this day, the value of United Airlines stock fell more than 40% resulting in a large jump in the leverage ratio. FIG. 13 shows term structures of credit spreads before and after the crisis. The credit spreads are based on zero-recovery zero-coupon bonds with prices given by equation (9). Independence between risk-less short interest rates and the default event is assumed. The new high in leverage ratio raised credit spreads across the boards and created a positive short spread, see FIG. 14. The Black-Cox and Merton models cannot forecast positive short spreads thanks to the assumption of predictability.

FIG. 13 shows term structures of default probabilities for United Airlines immediately before and after the attack on the World Trade Center. The leverage ratio jumped to a new high as the stock price plummeted and positive short spreads appeared.

Figure 14:
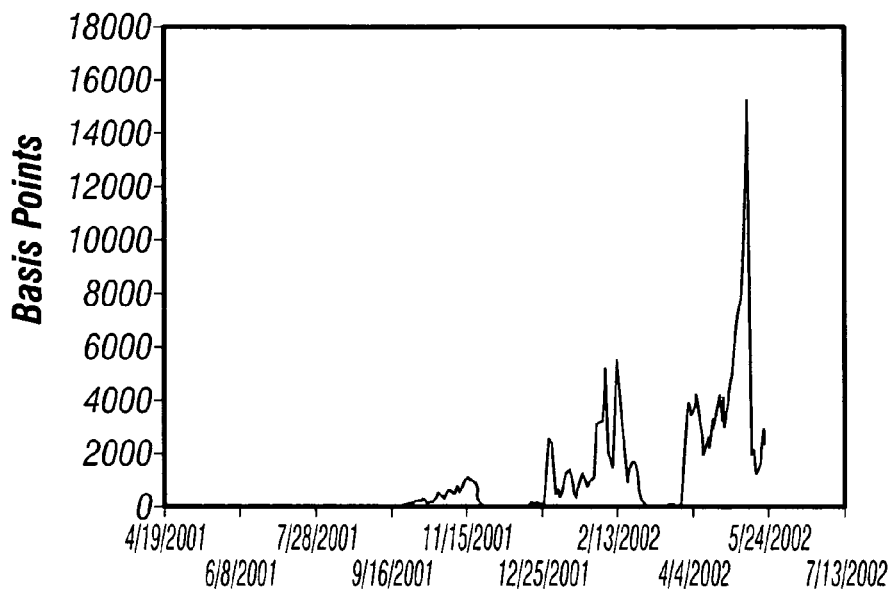
FIG. 14 shows times series of United Airlines short spreads according to the invention.

FIG. 14 shows a time series of United Airlines short spreads: The forecast short spread becomes astronomical when the leverage ratio becomes close to one. In this situation United is highly likely to default in the short term. Short spreads compensate investors for the short-term uncertainty about the default.

IBM Example

The IBM Example demonstrates a situation diametrically opposed to the one at United Airlines. Over the past several years, IBM's leverage ratio has been under 0.1, roughly 5-10% the size of the leverage ratio at United Airlines. Based on these numbers, any reasonable structural model forecasts that there is virtually no chance that IBM imminently defaults on its debt. The invention's incomplete information model is no exception. However, an investor who believes that the leverage ratio is higher than indicated by the published numbers can interactively increase the uncertainty in the incomplete information model accordingly.

Figure 15:
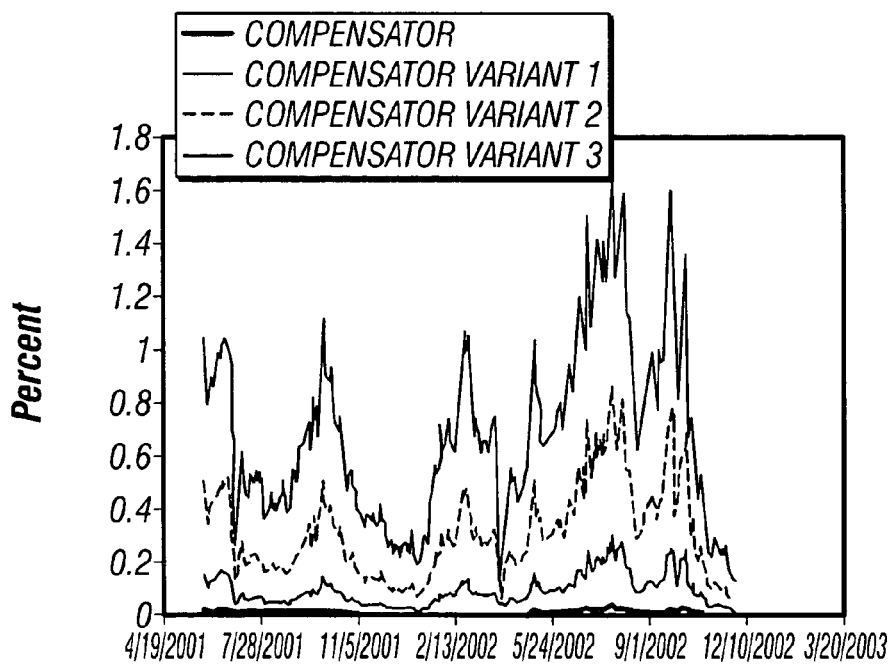
FIG. 15 shows one year default probabilities for IBM forecasts by the incomplete information model and several variants according to the invention.

FIG. 15 shows one year default probabilities for IBM forecast by the incomplete information model and several variants. Publicly reported numbers indicate a leverage ratio of less than 0.1 indicating strong financial health. The invention's incomplete information model, which is based on relatively high confidence in these numbers, forecasts very low default rates. However, investors who do not believe the reported values can interactively increase the variance and thereby generate much higher default probabilities.

That is, FIG. 15 shows default probability forecasts by the incomplete information model and several variants made by increasing the uncertainty around the location of the default barrier. In the period examined, the highest one year default probability forecast by the incomplete information model is quite low: less than 30 basis points. However, as confidence in published numbers diminishes, the variance around the default barrier location can be interactively increased and a corresponding increase in forecast default probability can be observed.

Figure 16:
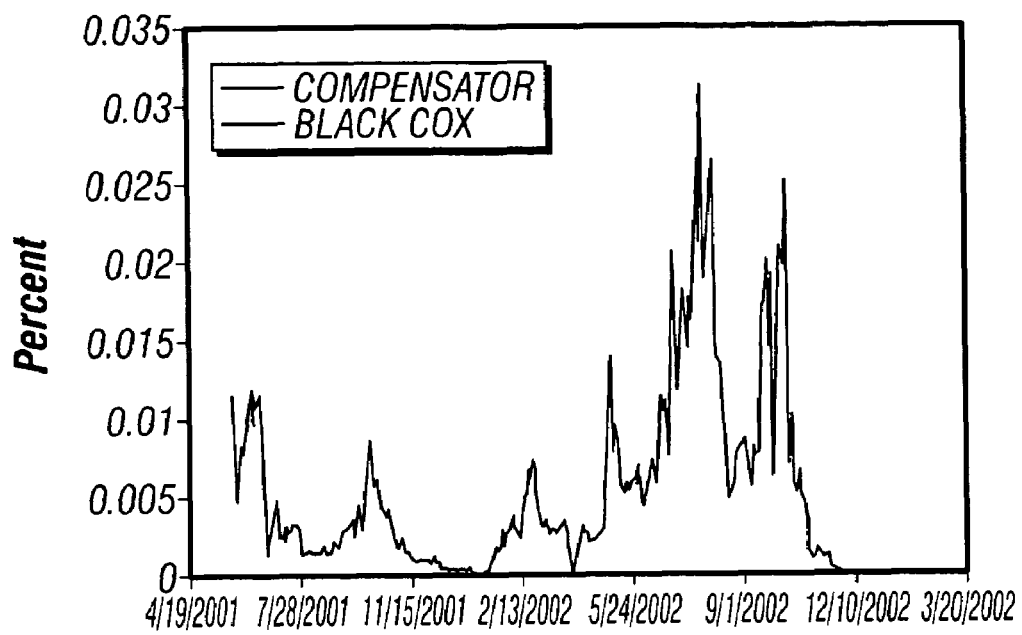
FIG. 16 shows one year default probabilities for IBM forecasts by the incomplete information model and the Black-Cox model.

FIG. 16 shows one year default probabilities for IBM forecast by the incomplete information model and the Black-Cox model. Both models generate small values but the Black-Cox values are much smaller because of the assumption of complete information.

Figure 17:
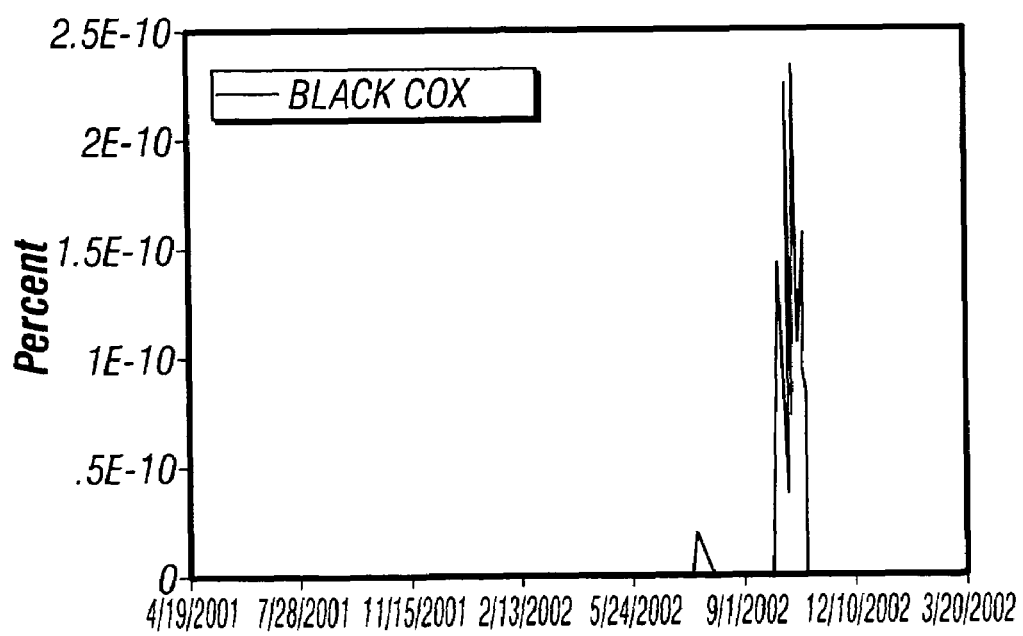
FIG. 17 shows one year default probabilities for IBM forecast by the Black-Cox model.

FIG. 17 shows one year default probabilities for IBM forecast by the Black-Cox model. On a sufficiently small scale, the reactions to market information are visible. The shape of the curve generated by this time series is similar to the shape of the compensator curve but the values are much smaller due to the assumption of complete information.

That is, FIG. 16 shows the compensator and Black-Cox models together. While both models forecast small probabilities of default over a one year horizon, the Black-Cox numbers are much smaller. However, they are not zero as shown in FIG. 17. Together, FIGS. 16 and 17 show that the time series of default probabilities forecast by the two models are similar in silhouette. Both models indicate that IBM debt is of the highest quality. However, only the incomplete information model can take account of the degree of uncertainty that an investor feels about the location of the default barrier.

General Electric Example

Figure 18:
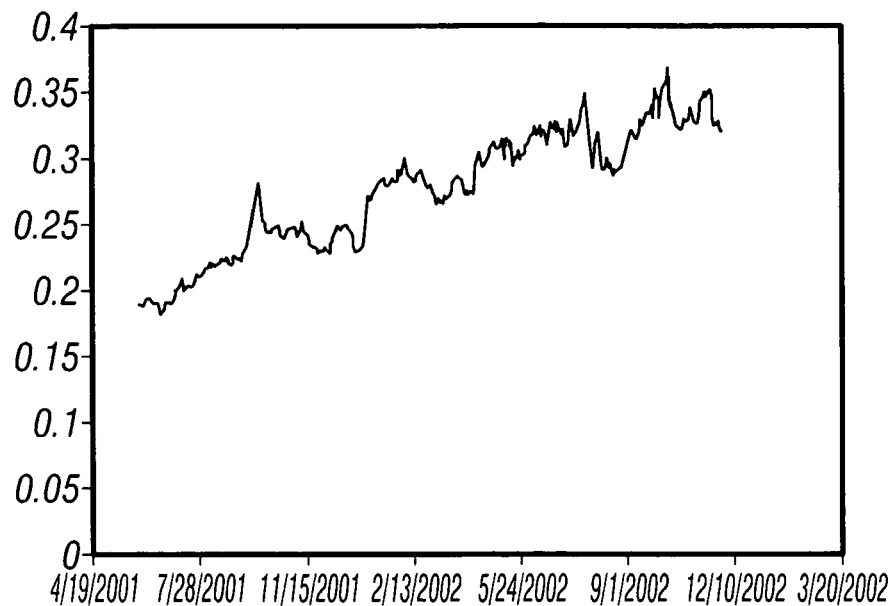
FIG. 18 shows the time series of leverage ratios for General Electric according to the invention.
Figure 19:
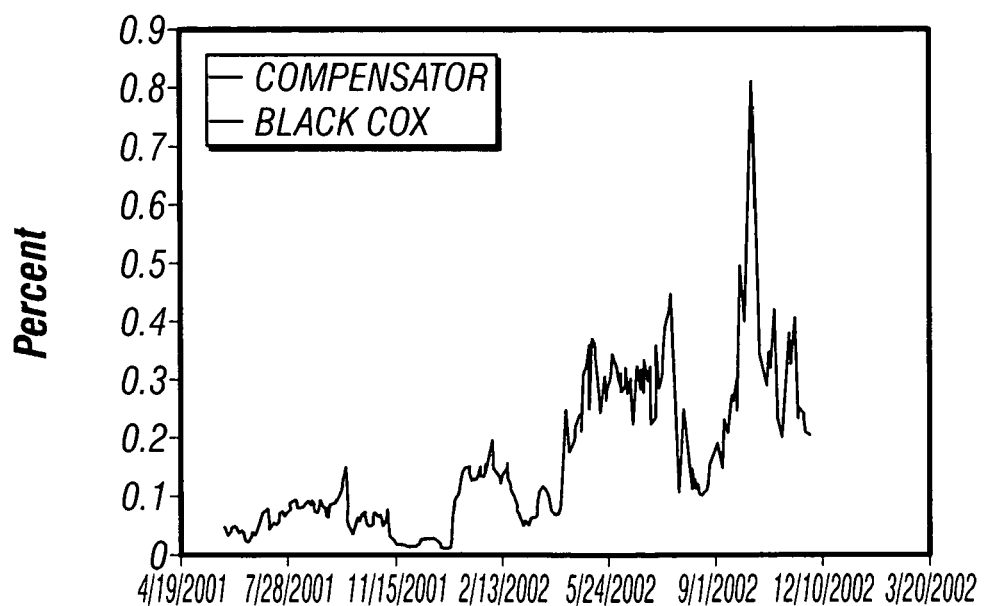
FIG. 19 shows one year default probabilities for General Electric generated by the compensator and Black-Cox models.
Figure 20:
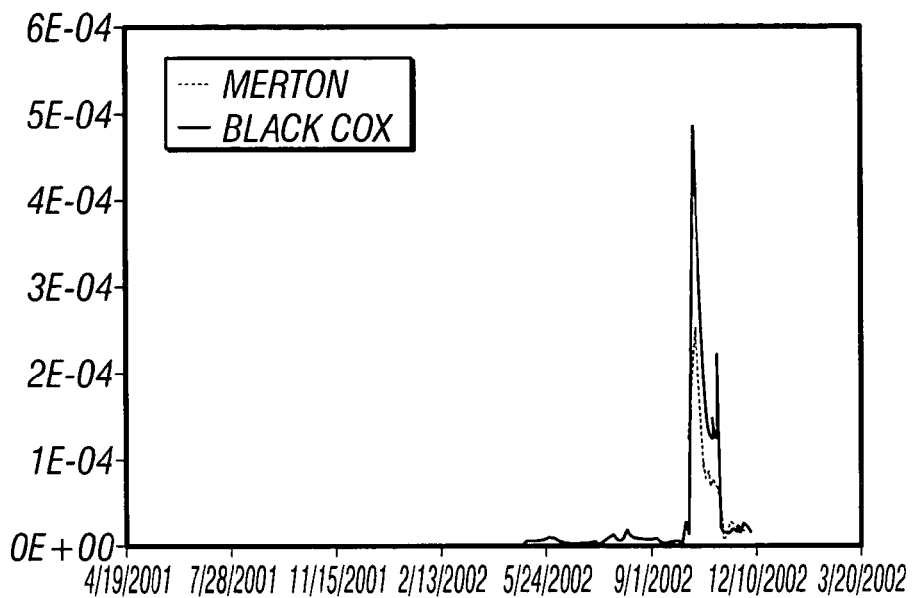
FIG. 20 shows one year default probabilities for General Electric generated by the Black-Cox and Merton models.

As a final example, consider the case of General Electric (GE), which is intermediate in credit quality between the two examples discussed above. FIG. 18 shows a time series of GE leverage ratios. The values show a slow, steady increase from 0.18 to almost 0.4 between April 2001 and the end of 2002. FIG. 19 depicts that the incomplete information model shows a slow, steady increase in one year default probability, ranging from a few basis points to almost 100 basis points (1%) over the same time horizon. This graph shows also the output of the Black-Cox model which looks flat on this time scale. However, under closer inspection, the Black-Cox model, and even the Merton model also react, as seen in FIG. 20. Note the similarity in the shapes of the graphs in FIGS. 19 and 20.

FIG. 18 shows time series of leverage ratios for General Electric.

FIG. 19 shows one year default probabilities for General Electric generated by the compensator and Black-Cox models. The Black-Cox values are indiscernible on the scale of the compensator values.

FIG. 20 shows one year default probabilities for General Electric generated by the Black-Cox and Merton models. The values are much smaller than the analogous compensator values. However, the shapes of the curves are quite similar.

Figure 21:
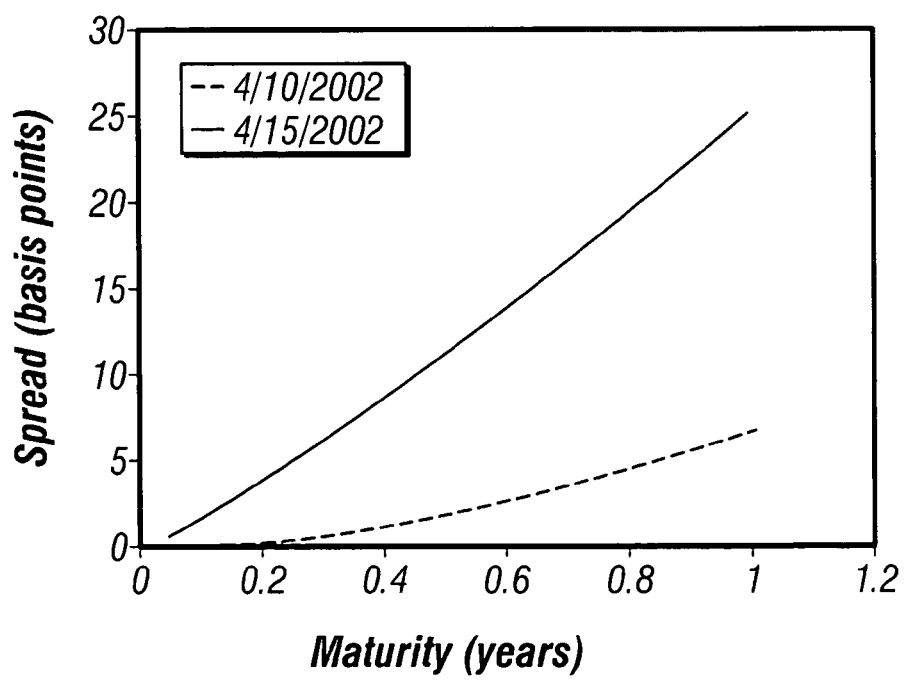
FIG. 21 shows terms structures of credit spreads for General Electric according to the invention.

In mid-April 2002, renowned money manager Bill Gross of Pimco publicly took General Electric to task for some of its borrowing practices as well as its failure to communicate with its investors. In response, the value of GE stock fell almost 15% over a period of several days. FIG. 21 shows term structures of credit spreads for GE on dates before and after the fall. Credit spreads not only increased during this five day period, but the shape of the curve changed dramatically by steepening at the short end. Of course, the spread values are small: on the order of a few basis points. The likelihood of default is still very small. However, between the tenth and fifteenth of April in 2002, there was an increase in uncertainty about the true level of GE liabilities and this was reflected immediately in the incomplete information model.

FIG. 21 shows term structures of credit spreads for General Electric: Bill Gross of Pimco has a powerful voice. His criticism of General Electric borrowing practices triggered an abrupt drop in equity value. This appears in the invention's model as a steeping of the spread curve near the short end. Appropriately, very short spreads were still zero. The company was not imminently in danger of default.

No Intensity

This section shows that $I^2$ is not a traditional reduced form model. In particular, the reduced form type pricing formulas in $I^2$ do not come from an intensity.

Given that a firm survives until a future time t, what is the rate of default implied by the invention's structural model with incomplete information? Here, the surprising and curious fact that invention's model implies no conditional default rates is demonstrated. In other words, there is no intensity associated with the model according to the invention.

As mentioned hereinabove, the existence of a conditional default rate requires the assumption that default is totally unpredictable. The incomplete information model according to the invention is based on the assumption of total unpredictability. It is implicit in the incomplete information hypothesis. Investors are unable to observe the distance between firm value and the default threshold because they do not know the default threshold. Consequently, such investors are not warned in advance when default is imminent. The rigorous argument goes as follows. Consider the compensator $A^\tau$ of the default process, which is given by the pricing trend A stopped at default. From Theorem 2, $$A^\tau(t,\omega) = -\log(G(m(t \wedge \tau(\omega),\omega))) \qquad (14)$$

Because $A^\tau$ is continuous, Theorem 1 implies that the default must be unpredictable. Therefore invention's model satisfies at least one of the conditions needed to guarantee the existence of an intensity. As shown below, it can not satisfy all of them.

To see that the model of the invention does not admit an intensity, recall the simple relation between the pricing trend and the intensity $\lambda(t,\omega)$ at time t in state $\omega$:

$$A(t, \omega) = \int_0^t \lambda(s, \omega) ds \qquad (15)$$

That is, the pricing trend A is differentiated to get the intensity. However, most compensators, as with most functions, do not have meaningful derivatives.

In particular, Theorem 2 asserts that the pricing trend for the provided model is given by $$A(t, \omega) = -\log(G(m(t,\omega))) \qquad (16)$$

It should be appreciated that, under the assumption that the barrier distribution function G is differentiable, the derivative of A is zero almost surely. This means that the pricing trend as in equation (15) cannot be written in terms of an intensity.

The key to creating a compensator based model that also admits an intensity lies in a different, perhaps even more realistic, information structure. For example, suppose that in addition to the default barrier, it is also uncertain about the process that describes the firm's value. Alternatively, suppose occasional noisy or lagged reports about the value of the firm are received. This gives rise to a pricing trend different from that prescribed by Theorem 2. This pricing trend may then be meaningfully differentiable, yielding an intensity.

Computing Environment

In one embodiment of the invention, one or more computer systems carrying out the functionality described herein. In another embodiment of the invention, a computer program product carries out the functionality described herein.

According to one embodiment of the invention, the functionality performed by the provided servers comprise computer programs running on one or more general purpose computers or on customized hardware. In another embodiment of the invention, the functionality is performed using a combination of software and hardware thus providing a union of controllers each performing a discrete task, such as for example: determining the default process output; determining a default probability; determining the compensator of the default probability; determining the pricing trend of the deterministic default probability; determining prices of credit sensitive derivatives; or determining the compensator of the default process. Such discrete tasks can be performed by one or more controllers and are still be within the spirit and scope of the invention.

Example Computer System

Figure 22:
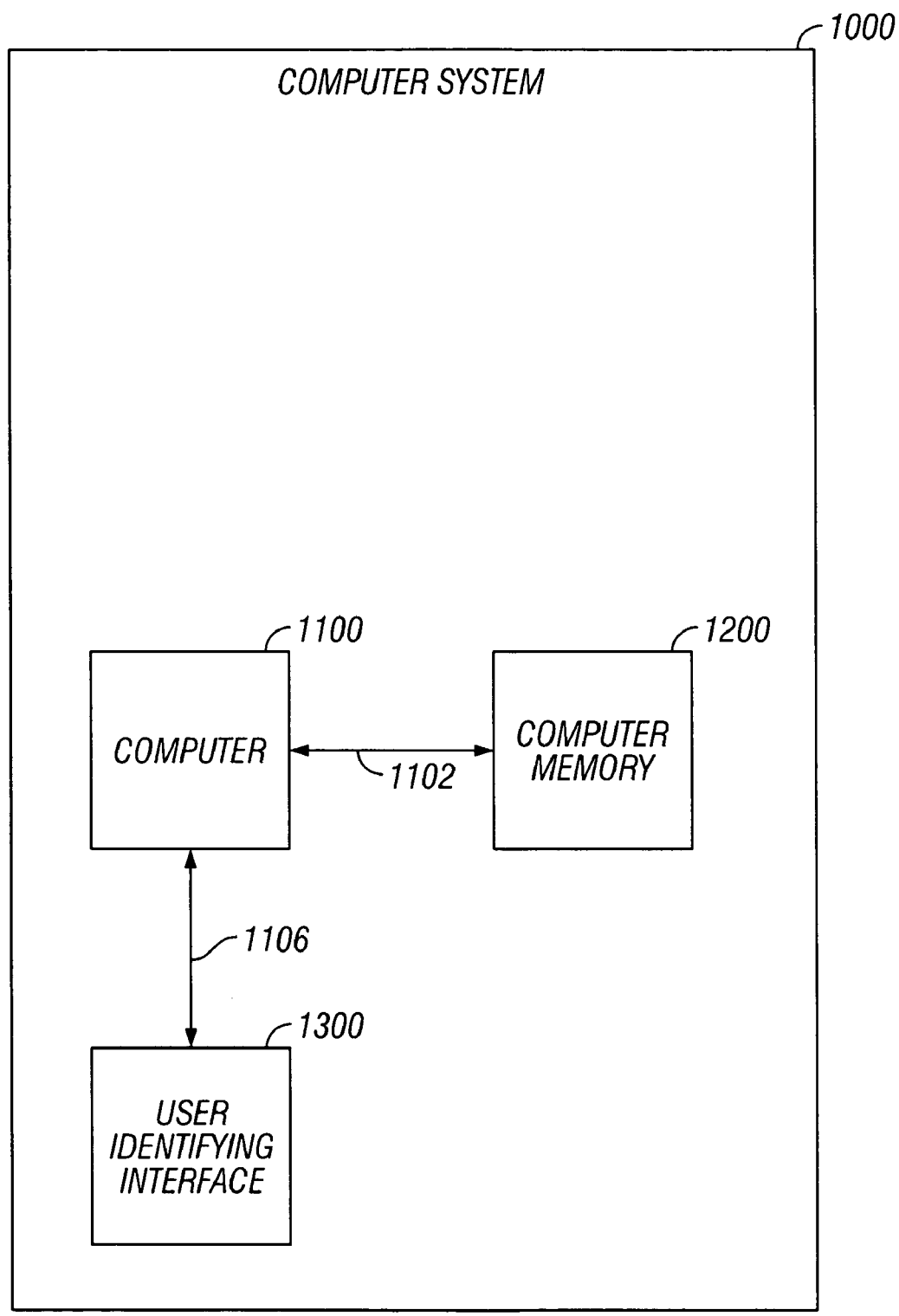
FIG. 22 shows a computer system according to the invention.

An example of a computer system is shown in FIG. 22. FIG. 22 depicts a simplified block diagram of a computer system 1000 controlling a credit risk modeling system in accordance with certain embodiments of the invention.

Computer system 1000 comprises a computer 1100 accessibly coupled 1102 to computer memory 1200. As used herein a computer system comprises at least one computer accessibly coupled to a computer memory. In certain embodiments, computer system 1000 comprises more than one computer, each with separate accessibly coupled computer memories.

As used herein, accessibly coupled computer memory 1200 includes at least a non-volatile memory. The non-volatile memory may be comprised of more than one non-volatile memory component. Access to a non-volatile memory component may be further organized about a file management system. Accessibly coupled memory 1200 may further include a volatile memory. Volatile memory may be comprised of more than one volatile memory component. Volatile memory components may include but are not limited to static RAM and various forms of Dynamic RAM. Access to a volatile memory component may be further organized as a cache memory interface to an often larger and slower memory component, which may be either volatile or non-volatile. The cache memory interface may be further multi-leveled, where successive levels of the cache memory incorporate a slower memory transfer rate to a larger amount of memory.

As used herein, computer refers to an instruction-processing computer, an inference engine or an analog computer.

Examples of an instruction-processing computer as used herein can be a Single Instruction Single Datapath (SISD) computer, Single Instruction Multiple Datapath (SIMD) computer, Multiple Instruction Single Datapath (MISD) computer, or a Multiple Instruction Multiple Datapath (MIMD) computer. Examples of SISD computers include microprocessors. Microprocessors as used herein, include but are not limited to super-scalar microprocessors, which concurrently execute components of several successive instructions of a single instruction stream involving a single datapath. Instruction processing mechanisms include but are not limited to native code execution mechanisms such as, for example, found in a 80×086 microprocessor, byte code interpreters such as JAVA and MPEG 4 use, threaded execution structures such as FORTH and Postscript use, or combinations of the above.

As used in the example herein, analog computers include but are not limited to circuitry composed of analog circuit, or devices of mixed analog and digital circuitry. Instructions presented to analog computer either provide a pattern or set internal controls. The internal controls may be addressable and may further include branching mechanisms which would be triggered either by time durations or through application of thresholding decision functions. Examples of such controls include use of different filter coefficients for voices speaking the same language with distinctive accents.

As used herein, program code segments refer to collections of instructions collectively performing some operation, which could operate an instruction processor, inference engine or analog computer, for example. Distinct program code segments could employ distinct instruction formats and operate distinct computers. By way of example, certain program code segments could be in native code for an 80×86 microprocessor, while other program code segments could be written in JAVA™ and yet other program code segments could be written in HTML (Hyperlink Text Markup Language).

Computer system 1000 further comprises a user interface subsystem 1300 communicatively coupled 1106 with computer 1100. User subsystem 1300 includes at least one mechanism presenting a user stimulus output stream to a user and at least one mechanism by which computer system 1000 is stimulated by a user to generate a user stimulus input stream.

The credit risk modeling system is controlled by the computer system 1000 executing a program operating system of program code segments residing in the accessibly coupled computer memory of at least one of the computers of the computer system.

A program operating system is a collection of program code segments residing in the memory of one or more computers comprising the computing system 1000. A program operating system serves as an overall organization for the performance of the operations, which may be performed in an essentially concurrent manner on one or more of the computers comprising the computer system controlling the credit risk modeling system.

A program code segment may be further comprised of a collection of more than one program code segment. These separate program code segments may be comprised of instructions in distinct languages, executing concurrently on distinct computers within the computer system.

SUMMARY

Compensators are the mathematical basis of the powerful incomplete information approach to analyzing default risk and credit-sensitive instruments. This framework is sufficiently general to encompass both intensity-based and traditional structural models. It also includes genuine hybrids: these are structural models that assume investors have incomplete information.

Incomplete information hybrids share the positive attributes of traditional structural models. They rely on an easy, intuitive definition of default and take full advantage of public, firm-specific information. However, since they also assume that this information is not complete, incomplete information models are economically more plausible than traditional structural models. They successfully avoid many of the pitfalls of traditional structural models without introducing unwanted complexity.

The embodiment of the invention providing the implementation of the simple incomplete information model presented herein is easy to fit market data. In broad strokes, it resembles traditional first passage time structural models. However, the incomplete information model reacts more quickly to market events and allows the user to calibrate the degree of uncertainty about the location of default barrier. It also forecasts positive short spreads for distressed firms.

Finally, the model is based on the assumption that default is a surprise event and yet does not admit a conditional rate of default is also an indication of the strength and breadth of the compensator approach.

Accordingly, although the invention has been described in detail with reference to particular preferred embodiments, persons possessing ordinary skill in the art to which this invention pertains will appreciate that various modifications and enhancements may be made without departing from the spirit and scope of the claims that follow.

The invention claimed is:

1. A computer implemented method for generating a term-structure of default probabilities, comprising the steps of:
at least one computer determining a default process by performing the steps comprising;
determining a firm's default barrier distribution from a plurality of risk factors comprising said firm's value and an unobservable default barrier, said unobservable default barrier comprising an incomplete information model;
determining said firm's conditional default probability over time using said default barrier distribution;
determining a pricing trend function using said conditional default probability where said pricing trend function estimates a probability of default of said firm; and
said at least one computer generating said term structure of default probabilities for said firm based on said pricing trend function.

2. The computer implemented method of claim 1, further comprising the step of:
calibrating parameters to represent the quality of incomplete information.

3. The computer implemented method of claim 1, further comprising the step of:
estimating diffusive and jump components of credit risk premium.

4. The computer implemented method of claim 1, further comprising the step of:
estimating market implied recovery rates.

5. The computer implemented method of claim 1, wherein said step of determining conditional default probability uses information comprising histories of equity prices, debt outstanding, agency ratings, and accounting variables.

6. The computer implemented method of claim 1, further comprising the steps of:

providing capability for triggering a default event when a firm value falls below a default barrier value;

providing capability for incorporating an assumption that said default barrier value is not publicly known;

providing capability for representing a predefault firm value process by a geometric Brownian motion; and using a history of fundamental data and other publicly available information in determining said default barrier distribution and for estimating parameters of said firm value process.

7. The computer implemented method of claim 6, further comprising the steps of:

using histories of daily equity prices and equity volatility forecasts, reported liabilities, and risk-free interest rates as input to said step of determining a conditional default probability;

using option pricing formulae to convert said equity prices and said equity volatility forecasts into associated firm values and firm volatility;

estimating a mean and height of a scaled beta distribution from history of firm leverage ratios; and providing capability for calibrating a degree of confidence about information by providing variance of said distribution as a free parameter.

8. The computer implemented method of claim 1, wherein said pricing trend function values credit-sensitive securities.

9. The computer implemented method of claim 1, further comprising:

said at least one computer creating fair values of credit-sensitive and default contingent securities based on said conditional default probability, said pricing trend, and said default barrier distribution.

10. The computer implemented method of claim 1, further comprising:

outputting to an investor, said term structure of default probabilities.

11. The computer implemented method of claim 1, further comprising:

12. A computer system for generating a term structure of default probabilities comprising:

at least one computer memory having program code that when executed operates at least one computer to determine a default process by performing the steps comprising;

determining a firm's default barrier distribution from a plurality of risk factors comprising said firm's value and an unobservable default barrier, said unobservable default barrier comprising an incomplete information model;

determining said firm's conditional default probability over time using said default barrier distribution;

determining a pricing trend function using said conditional default probability, where said pricing trend function estimates a probability of default of said firm; and said at least one computer memory having program code that when executed operates said at least one computer to generate said term structure of default probabilities for said firm based on said pricing trend function.

13. The computer system of claim 12, further comprising: calibrating parameters to represent the quality of incomplete information.

14. The computer system of claim 12, further comprising: estimating diffusive and jump components of credit risk premium.

15. The computer system of claim 12, further comprising: estimating market implied recovery rates.

16. The computer system of claim 12, wherein said step of determining conditional default probability uses information comprising histories of equity prices, debt outstanding, agency ratings, and accounting variables.

17. The computer system of claim 12, further comprising:

capability for triggering a default event when a firm value falls below a default barrier value capability for incorporating an assumption that said default barrier value is not publicly known;

capability for representing a predefault firm value process by a geometric Brownian motion; and using a history of fundamental data and other publicly available information in determining said default barrier distribution and for estimating parameters of said firm value process.

18. The computer system of claim 17, further comprising:

using daily equity prices and equity volatility forecasts, reported liabilities, and risk-free interest rates as input to said step of determining a conditional default probability;

using option pricing formulae to convert said equity prices and said equity volatility forecasts into associated firm values and firm volatility;

estimating a mean and height of a scaled beta distribution from history of firm leverage ratios; and calibrating degree of confidence about information by providing variance of said distribution as a free parameter.

19. The computer system of claim 12, wherein said pricing trend function values credit-sensitive securities.

20. The computer system of claim 12, further comprising:

creating fair values of credit-sensitive and default contingent securities based on said conditional default probability, said pricing trend, and said default barrier distribution.

21. The computer system of claim 12, further comprising:

said at least one computer memory having program code that when executed operates at least one computer to output to an investor said term structure of default probabilities.

22. The computer system of claim 8, further comprising:

determining a compensator using said conditional default process.

23. A computer program product comprising a computer useable medium having control logic stored therein for causing at least one computer to generate a term structure of default probabilities comprising:

computer readable program code for causing said at least one computer to determine a default process by performing the steps comprising;

determining a firm's default barrier distribution from a plurality of risk factors comprising said firm's value and an unobservable default barrier, said unobservable default barrier comprising an incomplete information model;

determining said firm's conditional default probability over time using said default barrier distribution;

determining a pricing trend using said conditional default probability, where said pricing trend function estimates a probability of default of said firm; and computer readable program code for causing said at least one computer to generate said term structure of default probabilities for said firm based on said pricing trend function.

24. The computer program product of claim 23, further comprising:

causing said at least one computer to calibrate parameters to represent the quality of incomplete information.

25. The computer program product of claim 23, further comprising:
   causing said at least one computer to estimate diffusive and jump components of credit risk premium.

26. The computer program product of claim 23, further comprising:
   causing said at least one computer to estimate market implied rates.

27. The computer program product of claim 23, wherein said step of determining conditional default probability uses information comprising histories of equity prices, debt outstanding, agency ratings, and accounting variables.

28. The computer program product of claim 23, further comprising:
   causing said at least one computer to provide capability for triggering a default event when a firm value falls below a default barrier value;
   causing said at least one computer to provide capability for incorporating an assumption that said default barrier value is not publicly known;
   causing said at least one computer to provide capability for representing a predefault firm value process by a geometric Brownian motion; and
   causing said at least one computer to use a history of fundamental data and other publicly available information in determining said default barrier distribution and for estimating parameters of said firm value process.

29. The computer program product of claim 28, further comprising:
   causing said at least one computer to use histories of daily equity prices and equity volatility forecasts, reported liabilities, and risk-free interest rates as input to said step of determining said conditional default probability;
   causing said at least one computer to use option pricing formulae to convert said equity prices and said equity volatility forecasts into associated firm values and firm volatility;
   causing said at least one computer to estimate a mean and height of a scaled beta distribution from history of firm leverage ratios; and
   causing said at least one computer to provide capability for calibrating a degree of confidence about information by providing variance of said distribution as a free parameter.

30. The computer program product of claim 23, wherein said pricing trend function values credit-sensitive securities.

31. The computer program product of claim 23, further comprising:
   creating fair values of credit-sensitive and default contingent securities based on said conditional default probability, said pricing trend, and said default barrier distribution.

32. The computer program product of claim 23, further comprising:
   computer readable program code for causing said at least one computer to output to an investor said term structure of default probabilities.

33. The computer program product of claim 23, further comprising:
   causing said at least one computer to determine a compensator using said conditional default process.

* * * * *